US007044113B2

(12) United States Patent
Bingham et al.

(10) Patent No.: US 7,044,113 B2
(45) Date of Patent: May 16, 2006

(54) SYSTEMS FOR DELIVERING LIQUIFIED GAS TO AN ENGINE

(75) Inventors: Dennis N. Bingham, Idaho Falls, ID (US); Bruce M. Wilding, Idaho Falls, ID (US); James E. O'Brien, Idaho Falls, ID (US); Ali S. Siahpush, Idaho Falls, ID (US); Kevin B. Brown, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 11/105,767

(22) Filed: Apr. 13, 2005

(65) Prior Publication Data

US 2005/0193990 A1 Sep. 8, 2005

Related U.S. Application Data

(60) Continuation of application No. 10/621,888, filed on Jul. 16, 2003, now Pat. No. 6,953,028, which is a division of application No. 10/190,409, filed on Jul. 5, 2002, now Pat. No. 6,619,273, which is a continuation of application No. 10/117,005, filed on Apr. 4, 2002, now Pat. No. 6,494,191, which is a division of application No. 09/572,523, filed on May 17, 2000, now abandoned, which is a continuation-in-part of application No. 09/212,489, filed on Dec. 16, 1998, now Pat. No. 6,125,637.

(60) Provisional application No. 60/069,697, filed on Dec. 16, 1997.

(51) Int. Cl.
*F02M 17/26* (2006.01)

(52) U.S. Cl. .................. 123/523; 137/561 R; 123/525; 123/527

(58) Field of Classification Search ................ 123/523, 123/525, 527; 137/561 R
See application file for complete search history.

(56) References Cited

U.S. PATENT DOCUMENTS

| 2,481,713 A | 4/1949 | Bertea |
| 2,645,906 A | 7/1953 | Ryan |
| 2,747,374 A | 5/1956 | Thompson |
| 2,916,061 A | 12/1959 | Hahn et al. |
| 2,958,204 A | 11/1960 | Spaulding |
| 2,964,919 A | 12/1960 | Howlett |

(Continued)

FOREIGN PATENT DOCUMENTS

CA 2293774 12/1998

OTHER PUBLICATIONS

"Clean-Air Law Gives Breaks to Cars Buyers, But Costs Are To High for Arizona Budget". The Wall Street Journal Interactive Section, Oct. 26, 2000.

(Continued)

*Primary Examiner*—Tony M. Argenbright
*Assistant Examiner*—Katrina Harris
(74) *Attorney, Agent, or Firm*—TraskBritt, P.C.

(57) ABSTRACT

A liquified gas delivery system for a motorized platform includes a holding tank configured to receive liquified gas. A first conduit extends from a vapor holding portion of the tank to a valve device. A second conduit extends from a liquid holding portion of the tank to the valve device. Fluid coupled to the valve device is a vaporizer which is in communication with an engine. The valve device selectively withdraws either liquified gas or liquified gas vapor from the tank depending on the pressure within the vapor holding portion of the tank. Various configurations of the delivery system can be utilized for pressurizing the tank during operation.

20 Claims, 16 Drawing Sheets

U.S. PATENT DOCUMENTS

| | | | |
|---|---|---|---|
| 2,996,892 A | 8/1961 | Clark | |
| 3,001,375 A | 9/1961 | Tauscher | |
| 3,018,635 A | 1/1962 | Keckler | |
| 3,070,968 A | 1/1963 | Gardner | |
| 3,151,640 A | 10/1964 | Teston | |
| 3,183,678 A | 5/1965 | Hosford | |
| 3,565,201 A * | 2/1971 | Petsinger | 180/69.5 |
| 3,633,372 A | 1/1972 | Kimmell et al. | |
| 3,658,179 A | 4/1972 | Baumann et al. | |
| 3,803,858 A | 4/1974 | Simon | |
| 3,898,853 A | 8/1975 | Lung | |
| 4,136,721 A | 1/1979 | Holmqvist et al. | |
| 4,463,735 A * | 8/1984 | Stoltman | 123/525 |
| 4,483,303 A | 11/1984 | Ishikawa et al. | |
| 4,487,025 A | 12/1984 | Hamid | |
| 4,561,258 A | 12/1985 | Brodbeck et al. | |
| 4,598,554 A | 7/1986 | Bastain | |
| 4,614,168 A | 9/1986 | Batchelor | |
| 4,744,222 A | 5/1988 | Murai | |
| 4,987,932 A | 1/1991 | Pierson | |
| 5,076,245 A | 12/1991 | Jones | |
| 5,121,609 A | 6/1992 | Cieslukowski | |
| 5,127,230 A | 7/1992 | Neeser et al. | |
| 5,163,409 A | 11/1992 | Gustafson et al. | |
| 5,291,869 A | 3/1994 | Bennett | |
| 5,325,894 A | 7/1994 | Kooy et al. | |
| 5,373,700 A | 12/1994 | McIntosh | |
| 5,421,162 A | 6/1995 | Gustafson et al. | |
| 5,542,398 A | 8/1996 | Marcon | |
| 5,566,712 A | 10/1996 | White et al. | |
| 5,590,535 A | 1/1997 | Rhoades | |
| 5,678,524 A | 10/1997 | Ofner et al. | |
| 6,125,637 A | 10/2000 | Bingham et al. | |

OTHER PUBLICATIONS

Hibl, J. J., "Cryogenic Fuel Systems for Motor Vehicles" *Advances in Cryogenic Engineering*, vol. 21, pp. 180-186.

* cited by examiner

SYSTEMS FOR DELIVERING LIQUIFIED GAS TO AN ENGINE

RELATED APPLICATIONS

This application is a Continuation of U.S. application Ser. No. 10/621,888, filed Jul. 16, 2003 now U.S. Pat. No. 6,953,028 which is a Divisional filed Jul. 5, 2002 of now issued U.S. Pat. No. 6,619,273, which is a Continuation filed Apr. 4, 2002 of now issued U.S. Pat. No. 6,494,191, which is a Divisional of U.S. application Ser. No. 09/572,523, filed on May 17, 2000, now abandoned, which is a Continuation-In-Part filed Dec. 16, 1998 of now issued U.S. Pat. No. 6,125,637, which claims priority to U.S. Provisional Application 60/069,697 filed on Dec. 16, 1997.

CONTRACTUAL ORIGIN OF THE INVENTION

The United States Government has certain rights in this invention pursuant to Contract No. DE-AC07-94ID13223, Contract No. DE-AC07-99ID13727, and Contract No. DE-AC07-05ID14517 between the United States Department of Energy and Battelle Energy Alliance, LLC.

BACKGROUND OF THE INVENTION

1. Field of the Invention

The present invention relates to fuel delivery systems. More specifically, the present invention relates to systems and methods for delivering liquified gas from a holding tank to an engine.

2. Present State of the Art

The increasing output of automobile emissions and the decreasing supply of oil reserves has motivated the search for alternative motor vehicle fuels. One alternative fuel is natural gas. Natural gas is clean burning and can be stored in a dense, high energy liquid form. Liquefying natural gas is accomplished by cooling the natural gas to a cryogenic temperature, typically below −260° F., which condenses the gas into a liquid. Working with and keeping natural gas at a cryogenic temperature, however, creates inherent problems. Furthermore, natural gas, prior to combustion, is a harmful greenhouse gas. As such, it is important that the escape of any natural gas be minimized to prevent increased harm to the atmosphere.

In one approach to using natural gas in automobiles, the natural gas is initially stored in large tanks at refueling stations. The large tanks maintain the fuel at a cryogenic temperature so as to keep the natural gas in a dense liquid state. Smaller insulated fuel tanks are located within the automobiles and can be filled with the liquified natural gas at a refueling station. As discussed above, it is desirable to store the natural gas in a liquified state. It is also beneficial, however, to have the automobile fuel tank sufficiently pressurized so that the fuel therein will automatically flow to the vehicle engine. Although a pump can be used to deliver the fuel to the engine, use of a pump requires energy. Furthermore, pumping natural gas at cryogenic temperatures has been found to be problematic.

In one approach to obtaining the desired pressure within the automobile fuel tank, systems have been incorporated into refueling stations which warm the liquified natural gas as it is pumped into the automobile fuel tank. By heating the liquified natural gas to a desired temperature, a portion of the liquified natural gas vaporizes within the fuel tank to produce the desired pressure. The pressure created within the fuel tank as a result of warming the fuel is called "saturation pressure." Although this process achieves the desired objective, it also produces several problems.

For example, the systems for heating the natural gas at the refueling station are time consuming and expensive to operate and build. Furthermore, as a result of warming the natural gas, less natural gas can be stored within the fuel tank. In addition, since all of the natural gas that is pumped into the automobile fuel tank is heated, the fuel must be used relatively quickly to prevent having to vent any of the natural gas to the atmosphere. Although the automobile fuel tank is insulated, once the liquified natural gas is pumped therein, the fuel begins to slowly warm towards an equilibrium with the outside temperature. As the fuel warms, the pressure within the tank increases. Once the tank reaches a designed relief pressure, a pressure relief valve is opened allowing a portion of the natural gas to escape into the atmosphere, thereby decreasing the internal pressure. The time period that a tank can hold natural gas without having to vent is called the "hold time." As previously discussed, releasing natural gas into the atmosphere is both wasteful and potentially harmful.

In contrast, if the natural gas is consumed too quickly, the pressure within the fuel tank can drop below the required operating pressure. As liquified natural gas is consumed, the volume of the vapor holding portion of the fuel tank is increased. As this volume increases, a portion of the liquified natural gas is vaporized to fill the space within the fuel tank. Vaporization of natural gas is an endothermic process which absorbs heat. Accordingly, as the natural gas within the fuel tank is vaporized, the temperature and thus pressure within the fuel tank decreases. If liquified natural gas is consumed too quickly, the pressure will drop below the operating pressure.

In an alternative approach to pressurizing the automobile fuel tank, a heater is directly coupled with the automobile fuel tank for heating the liquified natural gas therein. The problem with this approach is that it takes both time and energy to heat the fuel within the fuel tank. Furthermore, the same problem exists of having to use the natural gas relatively quickly to prevent having to vent portions of the natural gas to the atmosphere.

Other problems in conventional liquified natural gas systems relate to the lines extending from the fuel tank to the engine. Many of the prior art systems require the use of electronic switches, solenoids, and computers to operate them. The use of such electronics is expensive, increases the complexity of the system, decreases the reliability of the system, and consumes large amounts of energy.

The same problems as discussed above for vehicles are also applicable to using natural gas or other liquified gases to run engines that are not vehicle related.

SUMMARY AND OBJECTS OF THE INVENTION

It is an object of the present invention to provide improved delivery systems and methods for delivering liquified gases to an engine.

Another object of the present invention is to provide improved delivery systems which do not require a liquified gas to be warmed as it is transferred from a refueling facility to a holding tank for operating an engine.

Yet another object of the present invention is to provide delivery systems which do not require all of the liquified gas disposed within the holding tank to be warmed therein.

Still another object of the present invention is to provide delivery systems which significantly increase the hold time of the liquified gas in the tank.

A further object of the present invention is to provide delivery systems for liquified gas which maintain a desired pressure within the holding tank substantially independent of the gas consumption rate.

Yet another object of the present invention is to provide delivery systems which enable relatively quick pressurization of the tank holding the liquified gas.

Finally, an additional object of the present invention to provide delivery systems which provide fuel lines extending from the tank to the engine that do not require the use of electronic switches, solenoids or computers to function.

To achieve the foregoing objects, and in accordance with the invention as embodied and broadly described herein, a liquified gas delivery system and method are provided for use with an engine mounted on a mobile or stationary vehicle. The liquified gas delivery system includes an insulated holding tank configured to receive a liquified gas at saturated liquid/gas conditions. The holding tank bounds a chamber which includes a liquid holding portion for holding liquified gas and a vapor holding portion for holding liquified gas vapor. A vapor conduit extends from the vapor holding portion of the tank to a valve device such as an economizer valve or ecoshunt valve. A liquid conduit extends from the liquid holding portion of the tank to the valve device. A transition conduit extends from the valve device to a vaporizer.

The valve device is configured to operate in one of two positions depending on the pressure within the vapor holding portion of the tank. When pressure within the vapor holding portion of the tank is below a select pressure, the valve device facilitates the flow of the liquified gas from the tank to the vaporizer. When the pressure within the vapor holding portion of the tank exceeds the select pressure, the valve device blocks the flow of liquified gas and facilitates the flow of the liquified gas vapor from the tank to the vaporizer. Once sufficient liquified gas vapor has been removed from the tank to drop the pressure therein below the select pressure, the valve device again facilitates the flow of the liquified gas from the tank to the vaporizer.

The vaporizer is heated with coolant from the engine. As liquified gas is passed through the vaporizer, the elevated temperature causes the liquified gas to flash into a vapor. A delivery conduit extends from the vaporizer to the engine for delivering the liquified gas vapor thereto. A return conduit having a check valve coupled therewith extends from the delivery conduit to the vapor holding portion of the tank. Feeding of the liquified gas vapor from the return conduit to the vapor holding portion of the tank functions to pressure the tank.

It is desirable to keep the liquified gas within the tank at the lowest economical temperature. At such a temperature, however, there may be insufficient saturation pressure within the vapor holding portion of the tank to drive the liquified gas from the tank to the engine. Until such time that the liquified gas warms up from the outside environment to a point that it produces the required saturation pressure, the liquified gas vapor feeding from the return conduit to the vapor holding portion of the tank functions to create the required pressure to operate the system.

To enable effective pressurization of the tank using the return conduit, the vaporizer is most effective when positioned a required distance below the surface of the liquified gas in the tank. Specifically, the head between the surface level of the liquified gas and the point in the vaporizer where the liquified gas is vaporized must be sufficiently large to create a required pressure on the vaporized gas leaving the vaporizer. This required pressure must be greater than the summation of the pressure losses on the gas as it passes from the tank through the valve device, vaporizer, and back to the tank. As a practical matter, to enable operation of the engine at low levels of fuel within the tank, the vaporizer is preferably positioned below the elevation of the tank.

The systems of the invention have several advantages over prior conventional systems. For example, in the present inventive system the liquified gas within the holding tank can be maintained at its lowest possible temperature. As a result, it is not necessary to incorporate systems for warming the liquified gas as it is transferred from a refueling facility, or systems for warming the liquified gas within the tank. Furthermore, since the liquified gas is maintained at a low temperature, the hold time for the tank is much longer than conventional systems. In addition, the present system can continually regulate the pressure within the tank independent of the consumption rate. Finally, the system can be operated in a passive configuration which does not require the use of electronic solenoids, switches, or computers to run.

These and other objects, features, and advantages of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

The present invention is directed to systems and methods for delivering saturated liquified gases from a holding tank to an engine mounted on a vehicle. As used in the specification and appended claims, the term "vehicle" is defined as any motorized platform, whether stationary or mobile. By way of example and not by limitation, mobile vehicles can include cars, pickup trucks, cargo trucks, buses, trains, trailers, tractors, construction vehicles, off-road equipment, farming vehicles, aircraft, helicopters, and the like; stationary vehicles can include motorized process equipment such as compressors, generators, heating and air conditioning systems, and the like. Virtually any motorized platform can use the system of the invention where the prime mover is an internal or external combustion device for generating energy.

Figure 1:
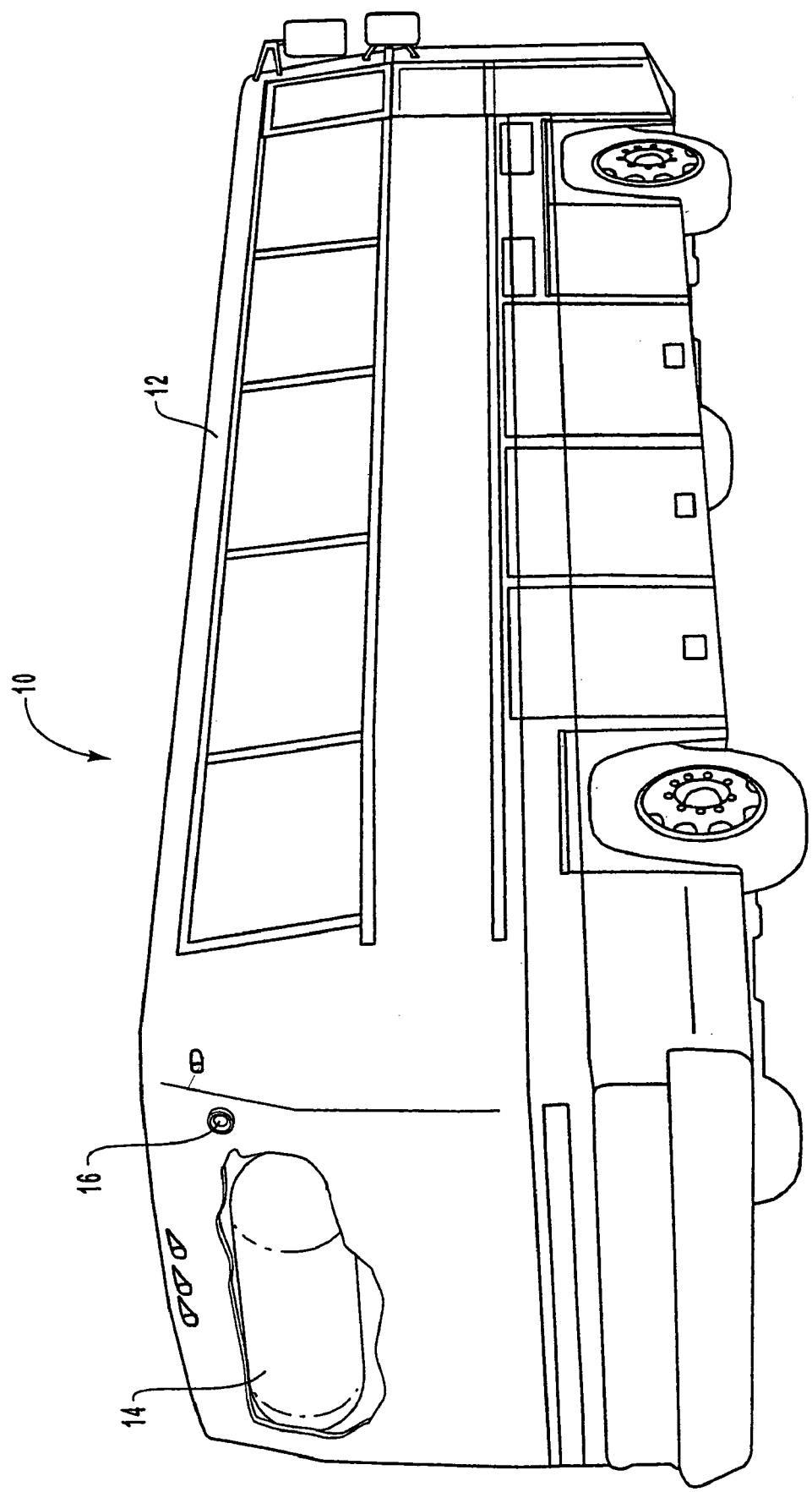
FIG. 1 is a perspective view of a vehicle incorporating the liquified gas delivery system of the present invention.

Referring to the drawings, wherein like structures are provided with like numerical reference designations, FIG. 1 depicts one embodiment of a vehicle 10 in the form of a bus which incorporates features of the present invention. Vehicle 10 is shown having a chassis 12 with a holding tank 14 mounted thereon. The term "chassis" as used in the specification and appended claims is intended to broadly include the frame and/or body of the vehicle.

Holding tank 14 is insulated, preferably by having a vacuum barrier, and is configured to receive and retain liquified gas at saturated conditions. The expression "saturated conditions" as used herein refers to the given temperature and pressure at which a gas/liquid phase equilibrium exits for a particular substance. The tank 14 is filled with liquified gas through an inlet 16. The expression "liquified gas" as used in the specification and appended claims is broadly intended to include gases that exist in a gaseous state at ambient conditions and require saturated conditions to exist in a liquid state. The liquified gas can include various substances that are fuels or oxidizers. By way of example and not limitation, liquified gas fuels can include hydrogen, hydrocarbon gases such as methane, ethane, propane, butane, natural gas, and the like, as well as various mixtures thereof; liquified gas oxidizers can include oxygen, fluorine, chlorine, mixtures thereof, and the like.

Preferably, tank 14 is adapted to receive and retain liquified gas at or below a given saturated condition temperature. For example, methane gas becomes liquified at a temperature of about −220° F. under a pressure of about 65 psi. It will be appreciated by those skilled in the art that the saturated condition temperature can vary widely depending on the specific gas utilized and the operating pressures under which the gas is employed.

Figure 2:
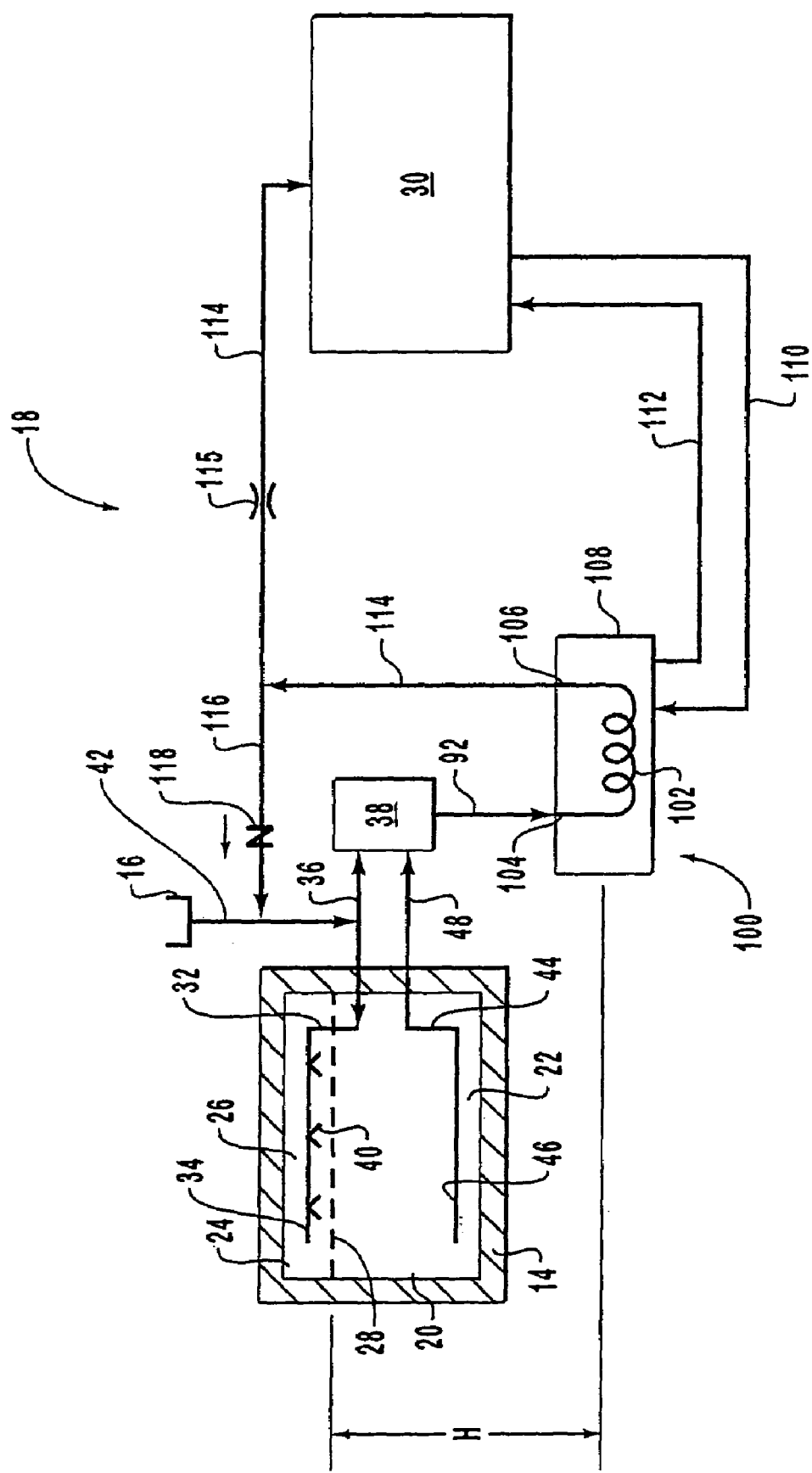
FIG. 2 is a schematic representation of one embodiment of the liquified gas delivery system incorporated into the vehicle in FIG. 1.

Depicted in FIG. 2 is a schematic representation of one embodiment of a liquified gas delivery system 18 that can be incorporated into vehicle 10. As depicted in FIG. 2, tank 14 comprises a liquid holding portion 20 for holding liquified gas 22 and a vapor holding portion 24 for holding vaporized gas 26. Liquid holding portion 20 and vapor holding portion 24 are separated by the surface of liquified gas 22 defined by dotted line 28. The volume of liquid holding portion 20 and vapor holding portion 24 vary inversely depending on the volume of liquified gas 22 within tank 14. That is, as liquified gas 22 is consumed, surface 28 of liquified gas 22 lowers, thereby decreasing the volume of liquid holding portion 20 and increasing the volume of vapor holding portion 24.

Tank 14 is filled with liquified gas 22 by passing liquified gas 22 through inlet 16 and into a filling conduit 42. Filling conduit 42 is fluid coupled with a vapor conduit 32 having a first end 34 disposed within vapor holding portion 24 and an opposed second end 36 fluid coupled to an economizer valve 38. Mounted at first end 34 of vapor conduit 32 are one or a plurality of spray nozzles 40. As a result of relative pressures, liquified gas 22 entering vapor conduit 32 from filling conduit 42 travels to first end 34 where it is sprayed into tank 14 through nozzles 40.

Nozzles 40 serve a unique purpose. Under normal operating conditions, once vehicle 10 has run for a sufficient period of time to substantially empty tank 14 of liquified gas 22, the remaining vaporized gas 26 within tank 14 is at a relatively high saturation pressure. This is because the remaining gas within tank 14 has been warmed by the outside environment during operation. During refueling, as the cold liquified gas is sprayed into tank 14 over the liquified gas vapor therein, the liquified gas vapor is cooled and condensed, thereby reducing the saturation pressure. As a result, tank 14 can be filled quickly and to a much greater extent without having to vent liquified gas vapor into the atmosphere. There are of course a variety of single or multiple spray nozzles that can be used. Furthermore, various dripping or other mechanisms can be used to help disperse the liquified gas over the vaporized gas within tank 14.

In one embodiment of the present invention, means are provided for delivering liquified gas from tank 14 to an engine 30. Engine 30 is likewise mounted to chassis 12 of vehicle 10. In more specific embodiments, means are provided for passively delivering the gas from tank 14 to engine 30 while automatically and passively maintaining a pressure within a predetermined range within vapor holding portion 24 of tank 14. As used in the specification and appended claims, the term "passively" defines a system that is self-regulating without the use of electronically actuated flow controlling devices such as solenoids or other valves or switches.

By way of example of the above delivery means and not by limitation, vapor conduit 32 extends from vapor holding portion 24 of tank 14 to economizer valve 38, as discussed above. Similarly, a liquid conduit 44 has a first end 46 positioned within liquid holding portion 20 of tank 14 and an opposing second end 48 fluid coupled to economizer valve 38. An opening at first end 46 of liquid conduit 44 enables liquified gas 22 to travel through liquid conduit 44 to economizer valve 38.

Figure 3:
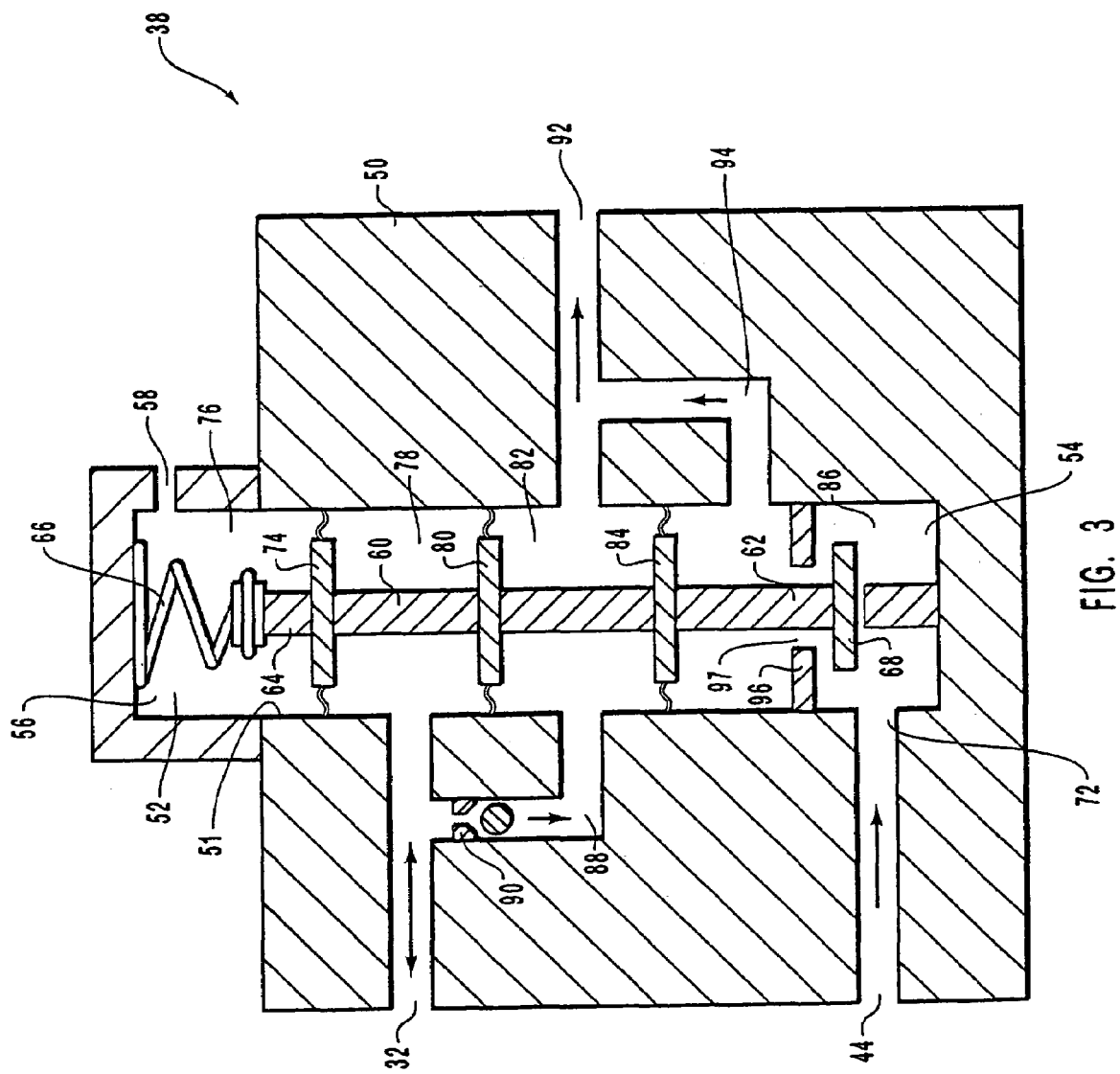
FIG. 3 is a schematic cross-sectional view of a valve device used in the liquified gas delivery system shown in FIG. 2.

The present invention also includes control means for automatically withdrawing a select gas chosen from either liquified gas 22 or vaporized gas 26 from tank 14 based on the pressure within tank 14. By way of example and not by limitation, depicted in FIG. 3 is one embodiment of a valve device in the form of an economizer valve 38. Economizer valve 38 includes a housing 50 having an interior surface 51 bounding an elongated chamber 52. Chamber 52 extends from a bottom end 54 to a top end 56. Longitudinally disposed within chamber 52 is a rod 60. Rod 60 also has a bottom end 62 and an opposing top end 64. Extending between top end 64 of rod 60 and housing 50 is a resiliently compressible spring 66. Radially projecting out at bottom end 62 of rod 60 is an annular seal 68. Radially inwardly projecting from interior surface 51 around bottom end 62 of rod 60 is a circular flange 96 having an opening 97 extending therethrough. Flange 96 is configured such that when seal 68 is biased thereagainst, opening 97 is sealed closed.

Extending across chamber 52 and sealed against rod 60 and interior surface 51 are three distinct flexible diaphragms which divide chamber 52 into four isolated compartments. Specifically, a flexible first diaphragm 74 bounds a first compartment 76 extending between first diaphragm 74 and top end 56 of chamber 52. First compartment 76 houses spring 66 and communicates to the exterior through an opening 58. An isolated second compartment 78 is positioned between first diaphragm 74 and a flexible second diaphragm 80. A third compartment 82 is formed between second diaphragm 80 and a flexible third diaphragm 84. Finally, a fourth compartment 86 is bounded between third diaphragm 84 and bottom end 54 of chamber 52.

Vapor conduit 32 extends through housing 50 and communicates with second compartment 78. A bypass conduit 88 extends from vapor conduit 32 to third compartment 82. A check valve 90 is positioned within bypass conduit 88. A transition conduit 92 extends through housing 50 from third compartment 82 to the exterior of economizer valve 38. Liquid conduit 44 extends through housing 50 and communicates with fourth compartment 86. A bypass conduit 94 extends from fourth compartment 86, at a side of flange 96 opposite liquid conduit 44, to transition conduit 92.

Economizer valve 38 is configured to automatically operate in one of two positions for withdrawing either vaporized gas 26 from tank 14 or liquified gas 22 from tank 14. The determination of which of the two gas forms is removed from tank 14 depends on the pressure within vapor holding portion 24. That is, economizer valve 38 moves between one of the two positions when a select pressure is reached within vapor holding portion 24. The select pressure is manually set and can vary depending on the intended use and system parameters. The select pressure is typically in a range between about 20 psi to about 140 psi, with about 60 psi to about 100 psi being preferred, and about 60 psi to about 80 psi being more preferred.

By way of example, when the pressure within vapor holding portion 24 is below the select pressure, liquified gas 22 flows through supply conduit 44 into fourth compartment 86, through opening 97 in flange 96, and through bypass conduit 94 where it eventually exits through transition conduit 92. Check valve 90 prevents liquified gas 22 from passing into vapor conduit 32. As the pressure increases within vapor holding portion 24, for reasons as will be discussed later, the pressure correspondingly increases within second compartment 78. This is because second compartment 78 and vapor holding portion 24 are coupled together by vapor conduit 32.

Since first compartment 76 is under atmospheric conditions as a result of opening 58, as second compartment 78 is pressurized, first diaphragm 74 is pressed into first compartment 76 causing rod 60 to compress against spring 66. The resistance of spring 66 is manually set such that as the pressure within second compartment 78 reaches the select pressure, rod 60 is sufficiently compressed against spring 66 so that seal 68 is biased against flange 96, thereby sealing opening 97 closed. Vaporized gas 26 is then permitted to pass from vapor conduit 32 through bypass conduit 88 into third compartment 82 and subsequently out transition conduit 92. Once the pressure within second compartment 78 drops below the select pressure, spring 66 pushes rod 60 downward so as to separate seal 68 and flange 96, thereby again allowing liquified gas 22 to pass therethrough. Standard economizer valves, such as that discussed above, can be purchased from MVE out of Bloomington, Minn.

Returning to FIG. 2, the select gas leaving economizer valve 38 travels through transition conduit 92 to a vaporizer 100. Vaporizers, also referred to as heat exchangers, can be purchased off the shelf. A conventional vaporizer comprises a coil 102 having an inlet end 104 and an outlet end 106. At least a portion of coil 102 is enclosed within a housing 108. In the present invention, housing 108 is fluid coupled to a pair of heating conduits 110 and 112 which continually cycle heated radiator fluid between housing 108 and engine 30. As liquified gas 22 passes through coil 102 within housing 108, the heat from the radiator fluid causes the liquified gas to flash to a vapor.

The present invention also provides means for delivering at least a portion of the select gas from vaporizer 100 to engine 30. By way of example and not by limitation, a delivery conduit 114 extends from vaporizer 100 to engine 30. To help optimize the process, a flow regulator 115 can be attached to delivery conduit 114. Means are also provided to enable delivery of a portion of the select gas from vaporizer 100 back to tank 14, for maintaining an operating pressure within the vapor holding portion of tank 14. By way of example and not by limitation, a return conduit 116 having a check valve 118 formed thereon extends from delivery conduit 114 to filling conduit 42. As a result, depending on the rate of fuel consumption by engine 30, a portion of the liquified gas vapor from delivery conduit 114 can travel through return conduit 116, filling conduit 42 and vapor conduit 32 where it subsequently enters into vapor holding portion 24 of tank 14. The feeding or at least communication of liquified gas vapor from delivery conduit 114 to vapor holding portion 24 provides the needed pressure for driving liquified gas 22 through the system to engine 30 without the need for a pump. When the pressure within vapor holding portion 24 exceeds the desired or select pressure, economizer valve 38 pulls off the liquified gas vapor as previously discussed.

There are of course, a variety of alternative conduit configurations that can be used to feed the liquified gas vapor back to vapor holding portion 24. By way of example, the liquified gas vapor can be fed back into the economizer valve, as will be illustrated in a subsequent embodiment. Furthermore, a conduit could be formed that extends directly between delivery conduit 114 and vapor holding portion 24. Furthermore, a conduit can be formed to extend directly between vaporizer 100 and vapor holding portion 24. Other embodiments will be set forth later in the disclosure.

One of the novel concepts of the present invention is the positioning of vaporizer 100 relative to tank 14. To enable the vaporized gas leaving vaporizer 100 to most efficiently flow back into vapor holding portion 24, a maximum elevation difference or head H should be achieved between surface 28 of liquified gas 22 and the point in vaporizer 100 where the liquified gas is vaporized. Specifically, head H must be sufficiently large to produce a pressure on the vaporized gas leaving vaporizer 100 that is greater than the summation of all the pressure losses as a result of the gas passing from tank 14 through economizer valve 38, vaporizer 100, and the various conduits back to vapor holding portion 24. If head H is insufficient to overcome these pressure losses, the liquified gas vapor will not flow back into vapor holding portion 24 and thus pressure will not build therein. Since surface 28 of liquified gas 22 continually drops as the gas is consumed in engine 30, to maintain operation at low fuel levels it is preferred that vaporizer 100 be positioned below tank 14.

The greater the head H, the faster in which vapor holding portion 24 will be pressurized. The rate at which vapor holding portion 24 is pressurize is an important consideration for startup time after refueling. That is, once tank 14 is filled with liquified gas, the pressure within vapor holding portion 24 is typically insufficient to deliver liquified gas to engine 30. Alternative heating sources such as solar radiation, batteries, or using gasoline to run engine 30 can be used for heating vaporizer 100 and thus pressurizing vapor holding portion 24. However, it is desirable to be able to pressurize vapor holding portion 24 as quickly as possible so as to enable operation using the liquified gas.

By increasing the head H, pressure on the liquified gas vapor is increased, thereby increasing the rate and shortening the time for pressurizing vapor holding portion 24. In one embodiment, vapor holding portion 24 of tank 14 can be pressurized to a select operational pressure in a period of time after refueling less than about 15 minutes, more preferably in less than about 10 minutes, and most preferably in less than about 5 minutes. In some embodiments, it is also desirable that vaporizer 100 be positioned below tank 14 at a preselected distance. An increased distance between the tank and vaporizer positioned therebelow has been found to improve the performance of the liquified gas delivery system.

Figure 4:
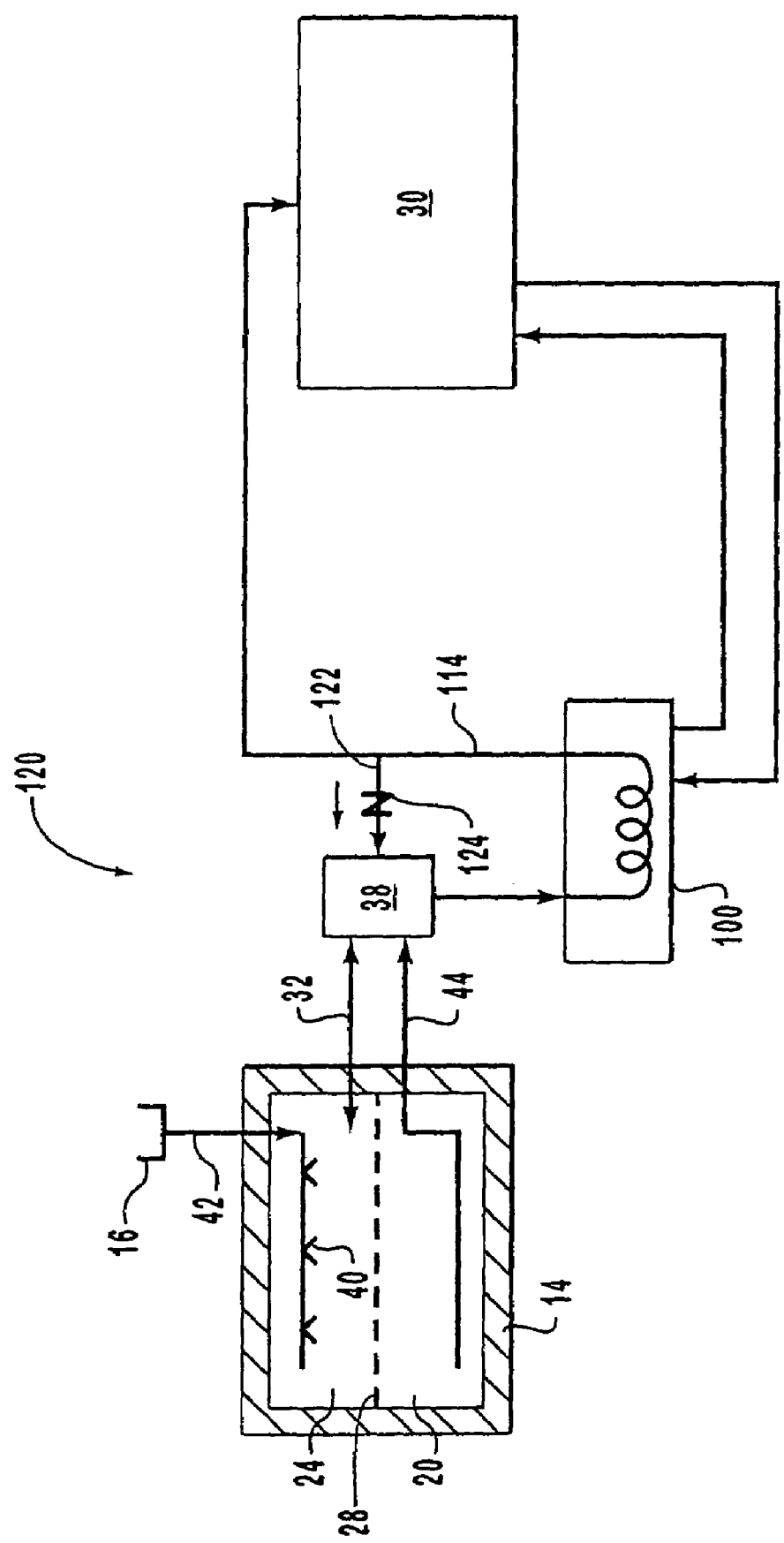
FIG. 4 is a schematic representation of an alternative embodiment of the liquified gas delivery system shown in FIG. 2.
Figure 5:
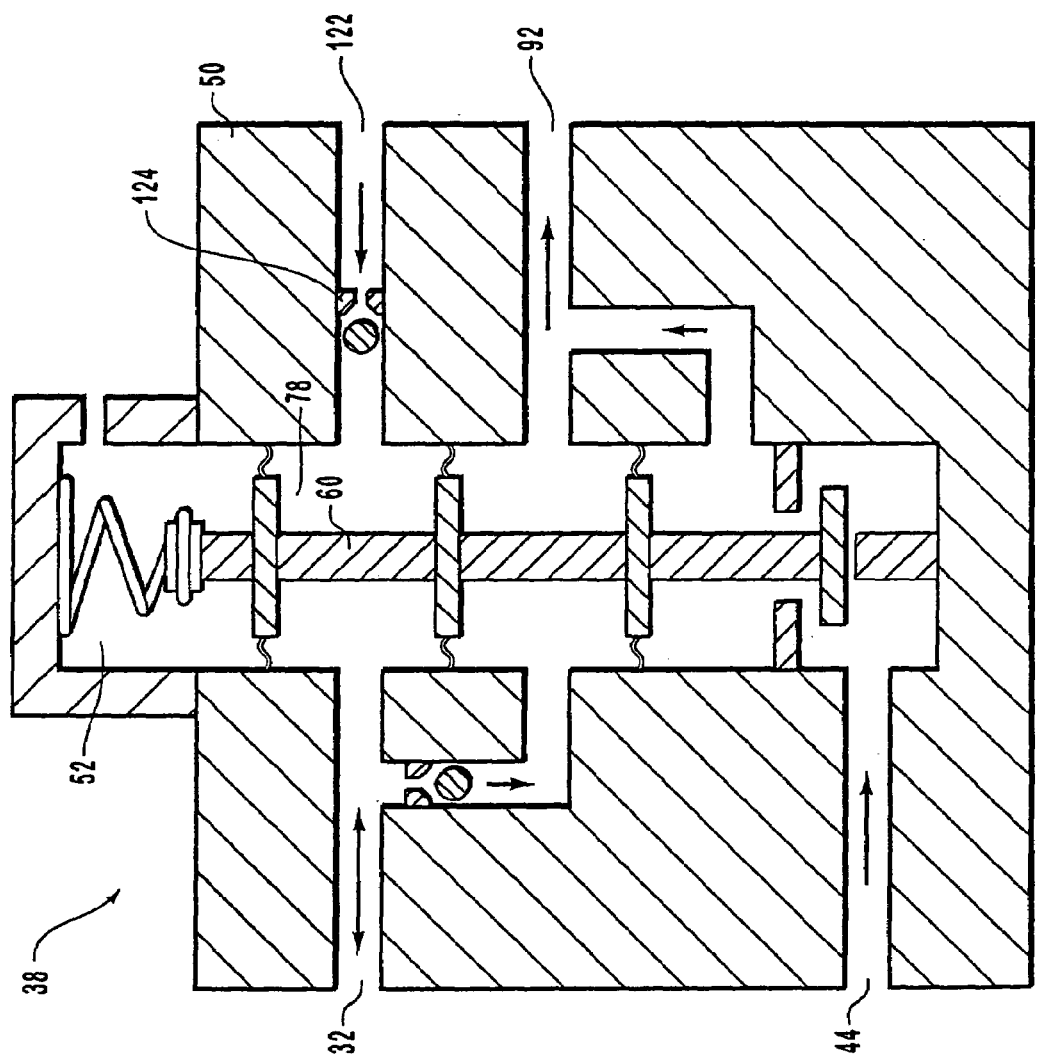
FIG. 5 is a schematic cross-sectional view of a valve device used in the liquified gas delivery system shown in FIG. 4.

Depicted in FIG. 4 is an alternative embodiment of a liquified gas delivery system 120. Like structural elements between delivery system 18 and 120 are identified by like reference characters. In contrast to delivery system 18, filling conduit 42 can directly fluid couple with tank 14 through nozzles 40. Furthermore, vapor conduit 32 need not communicate with nozzles 40. Return conduit 116 has been removed and replaced with a conduit 122. Conduit 122 has a check valve 124 formed therewith and extends from delivery conduit 114 to economizer valve 38. As depicted in FIG. 5, economizer valve 38 has been altered to have conduit 122 extending through housing 50 to second compartment 78. Check valve 124 prevents liquified gas vapor from passing from second compartment 78 through conduit 122. Check valve 124, however, does enable the liquified gas vapor to pass from delivery conduit 114 into second compartment 78 for pressurization of vapor holding portion 24, thereby producing the same effect as previously discussed with economizer valve 38 in FIG. 3.

Figure 6:
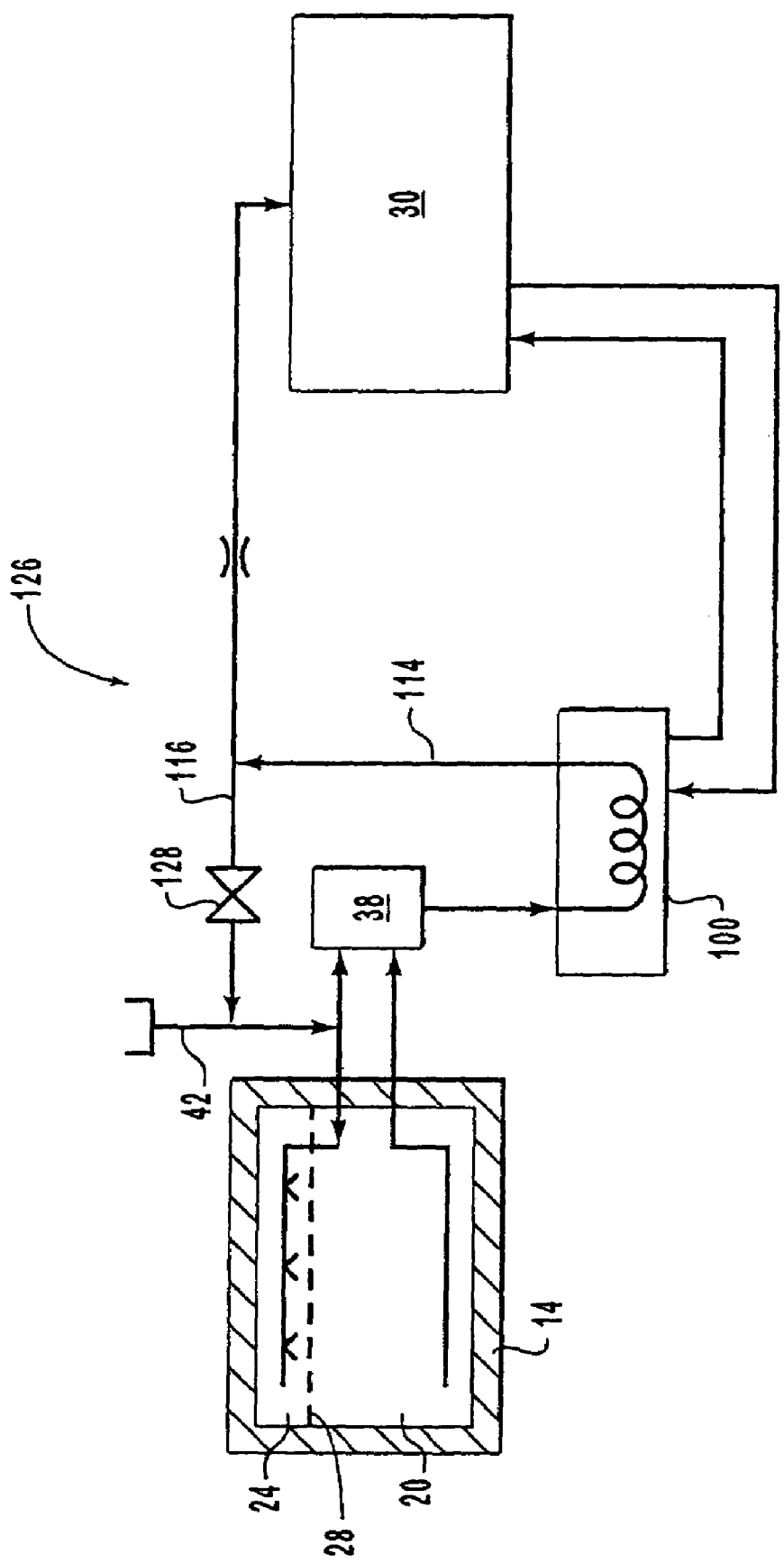
FIGS. 6–12 are schematic representations of alternative embodiments of the liquified gas delivery system shown in FIG. 2.

FIG. 6 is an alternative embodiment of a liquified gas delivery system 126 in which one way check valve 118 of delivery system 18 has been replaced by an electronic solenoid 128. Solenoid 128 electronically opens and closes conduit 116.

Figure 7:
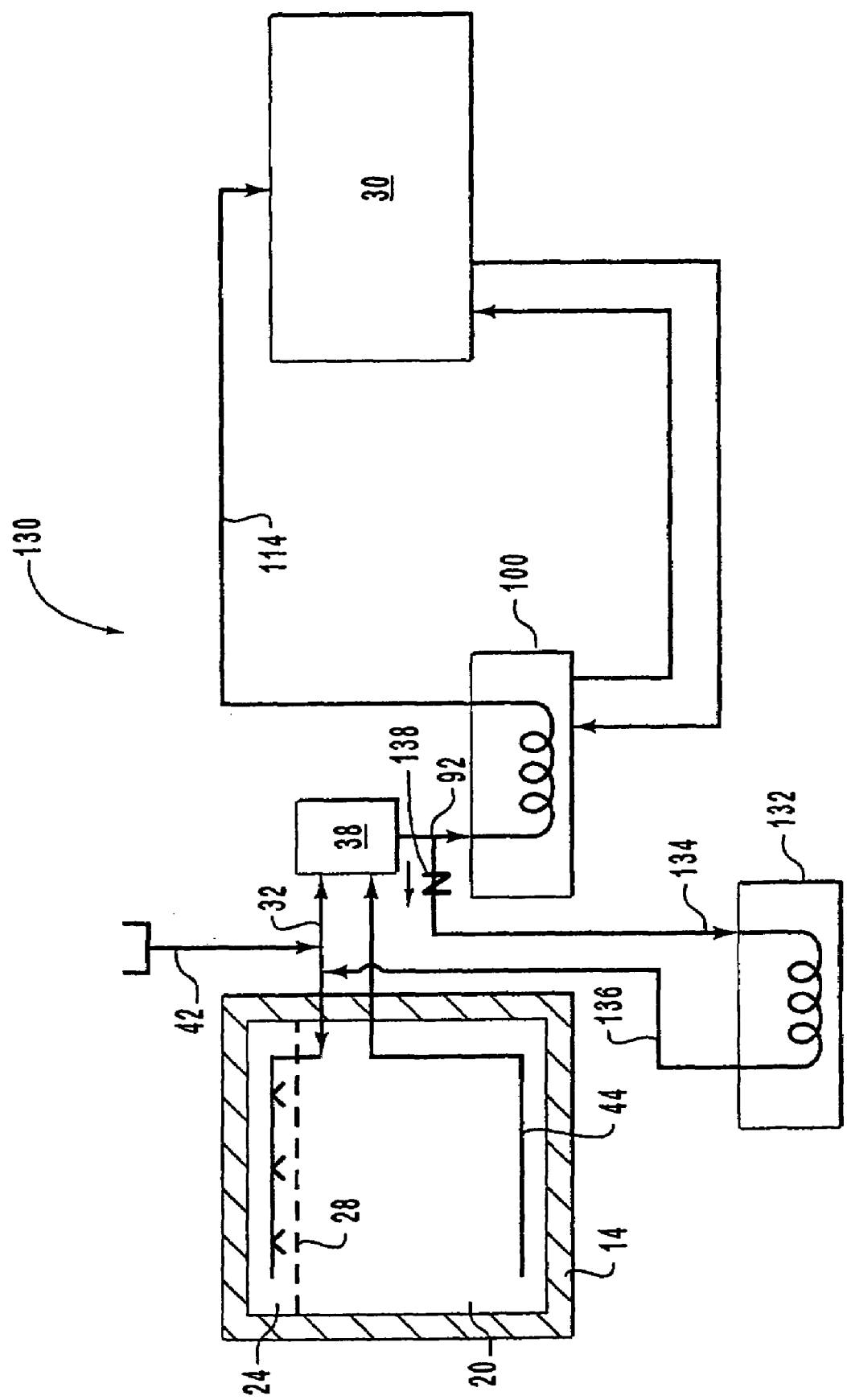

FIG. 7 is an alternative embodiment of a liquified gas delivery system 130. This embodiment can be used when it is impossible or impractical to position vaporizer 100 at a position sufficiently far below surface 28 of liquified gas 22 to obtain the desired head H. In this embodiment, a smaller vaporizer 132 can be positioned at a preferred distance below tank 14. The vaporizer 132 is an example of a means for maintaining an operating pressure within the vapor holding portion of the tank. A conduit 134 having a one way check valve 138 fluid couples transition conduit 92 to vaporizer 132. Conduit 134 thus provides liquified gas to vaporizer 132. A conduit 136 delivers the gas vaporized by vaporizer 132 to vapor conduit 32, thereby pressurizing vapor holding portion 24 in substantially the same way as previously discussed with regard to FIG. 2. Vaporizer 132 can be heated using a variety of alternative designs, for example, coolant can be taken from engine 30. Alternatively, solar or battery operated heating devices can be used.

Figure 8:
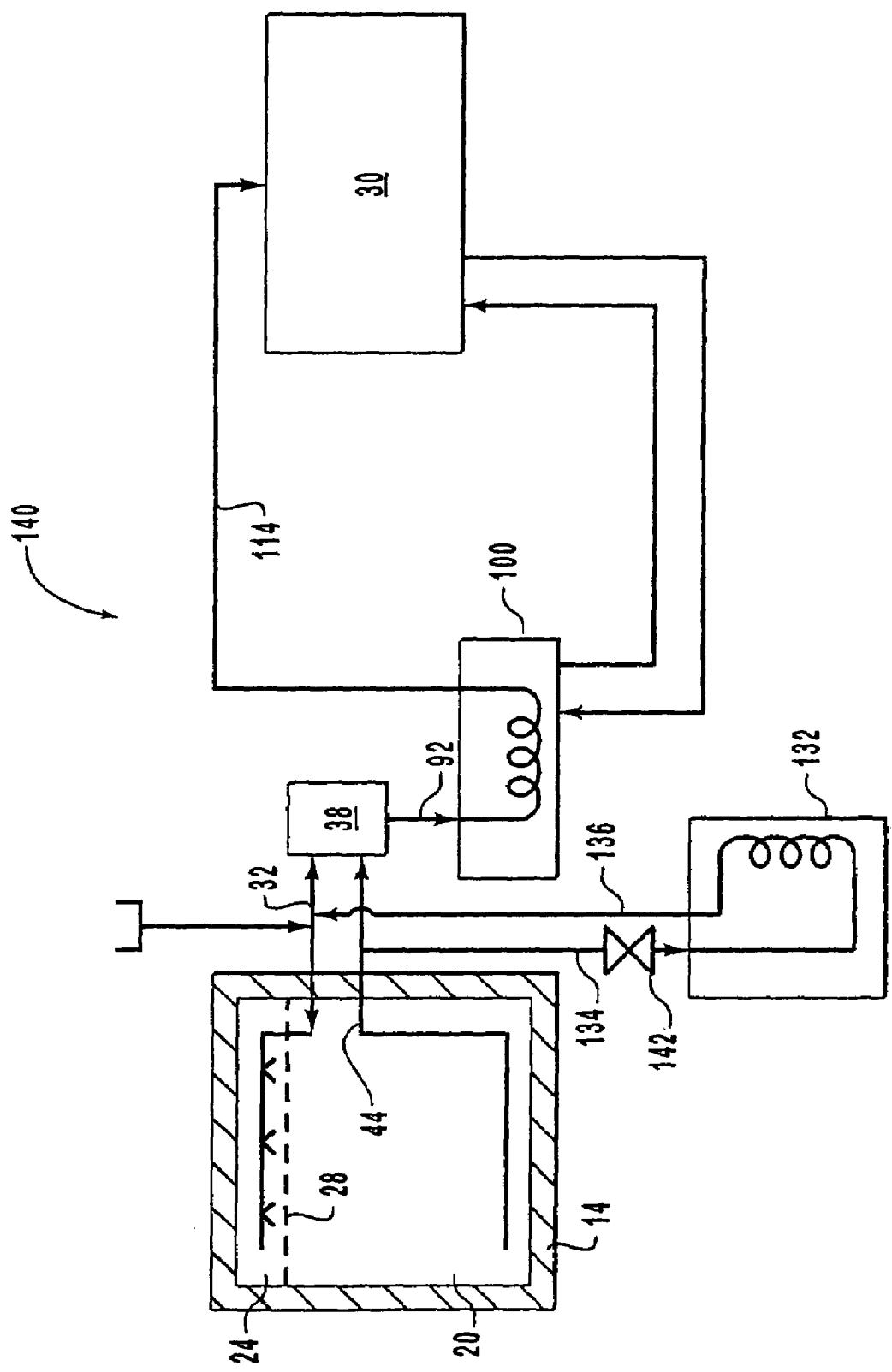

Depicted in FIG. 8 is a fluid delivery system 140 similar to fluid delivery system 130 depicted in FIG. 7. In contrast, however, conduit 134 of fluid delivery system 140 is fluid coupled to supply conduit 44 rather than transition conduit 92. Furthermore, one way check valve 138 has been replaced by an electronically operated solenoid valve 142.

Figure 9:
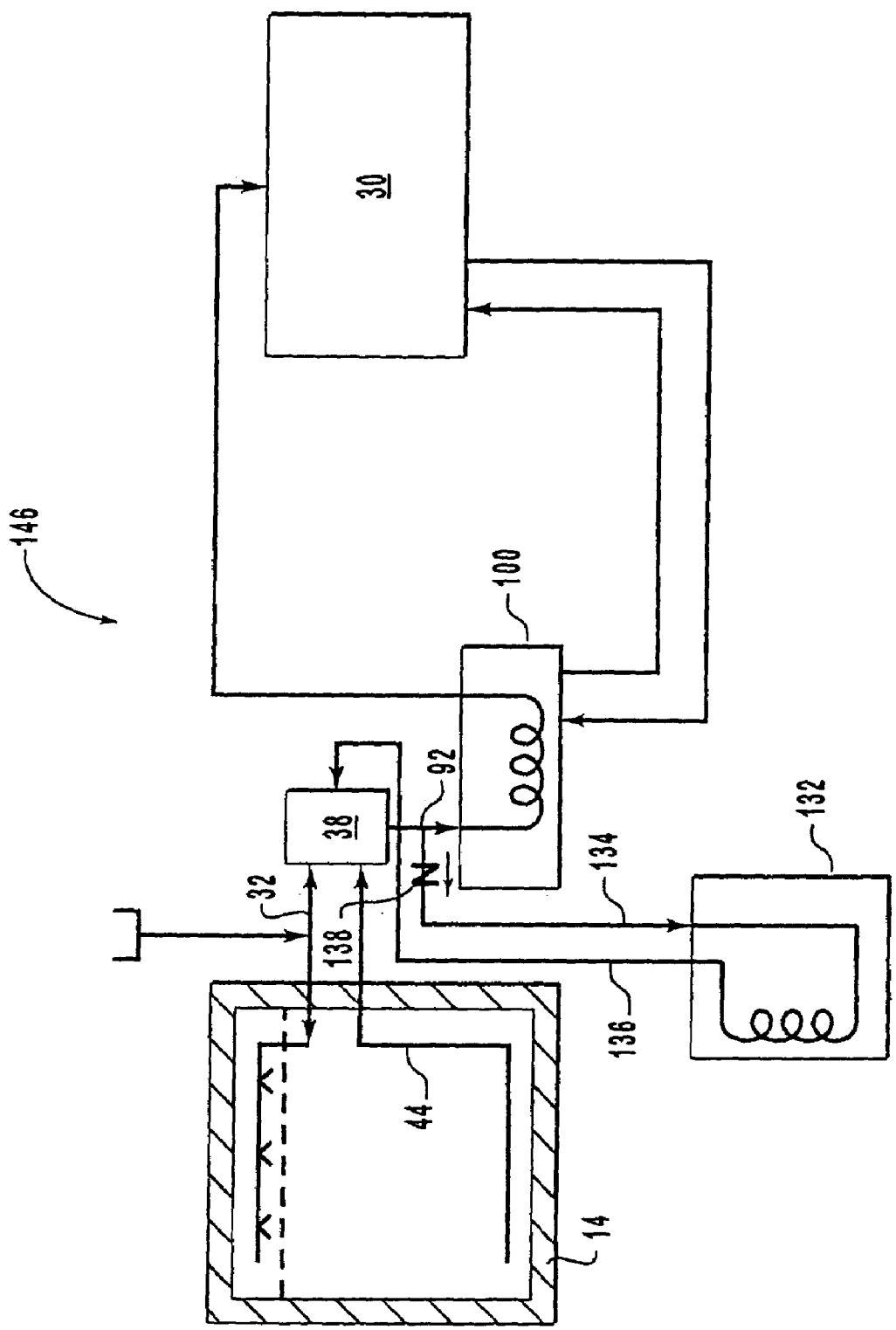

Depicted in FIG. 9 is a fluid delivery system 146 also comparable to fluid delivery system 130. In fluid delivery system 146, however, conduit 136 is fluid coupled to economizer valve 38 in substantially the same way that conduit 122 is coupled to economizer valve 38 as previously discussed with regard to FIGS. 4 and 5.

Figure 10:
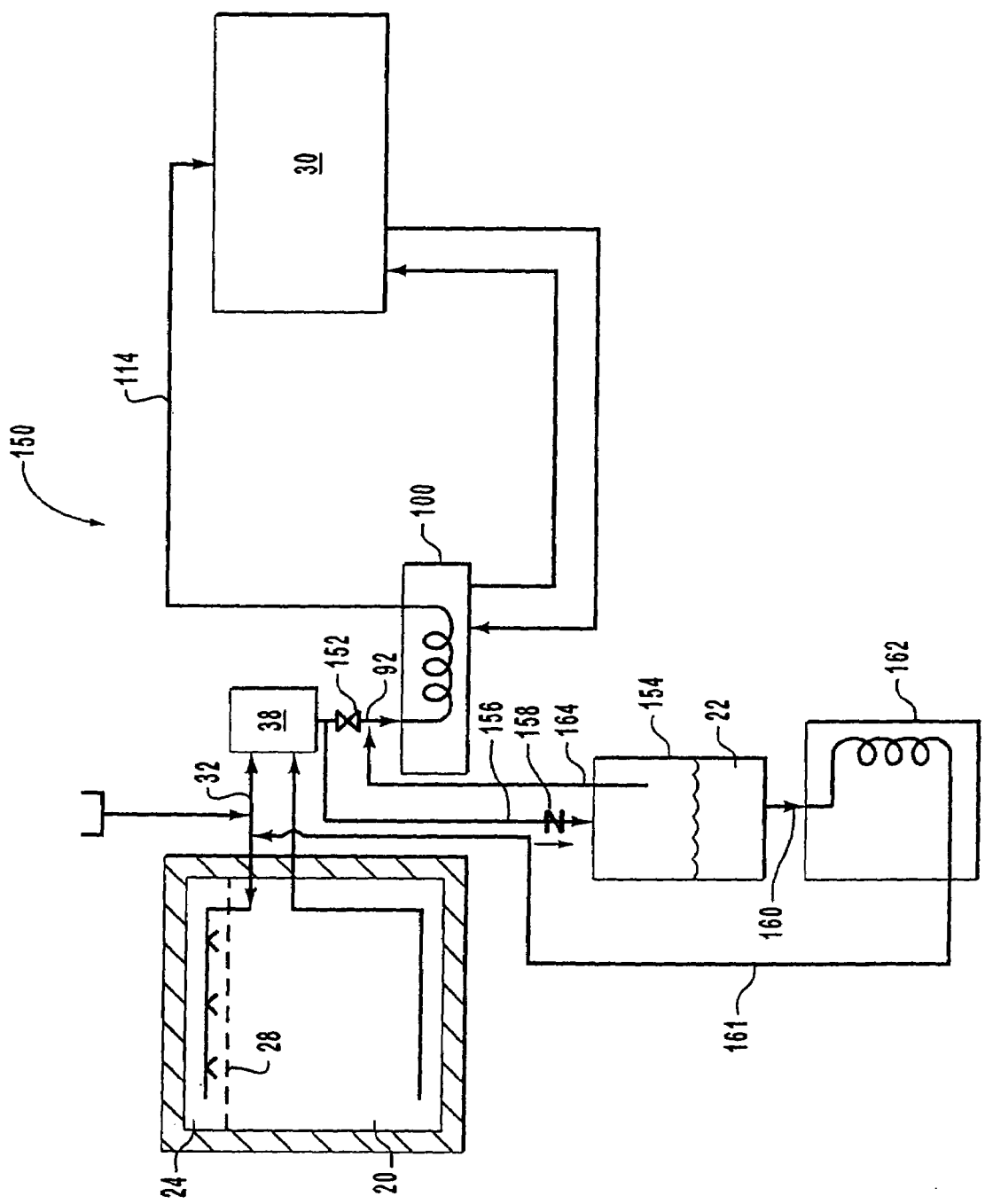

Depicted in FIG. 10 is yet another alternative embodiment of a fluid delivery system 150. In this embodiment, when vaporizer 100 is positioned too high relative to level 28 of liquified gas 22 to drive fuel into engine 30, solenoid 152 on transition conduit 92 closes causing the gas to flow from transition conduit 92 to a small reservoir 154 through a conduit 156. A one way check valve 158 prevents a back flow of liquified gas vapor. In turn, a conduit 160 feeds liquified gas 22 from reservoir 154 to a secondary vaporizer 162 positioned at a desired elevation relative to tank 14. Vaporizer 162 is also coupled to vapor conduit 32 by a conduit 161 for pressurizing vapor holding portion 24 as previously discussed with regard to FIG. 2. A conduit 164 allows liquified gas vapor to travel from reservoir 154 back to vaporizer 100. Once sufficient pressure is built within the system, solenoid 152 can be opened to allow direct flow into vaporizer 100.

Figure 11:
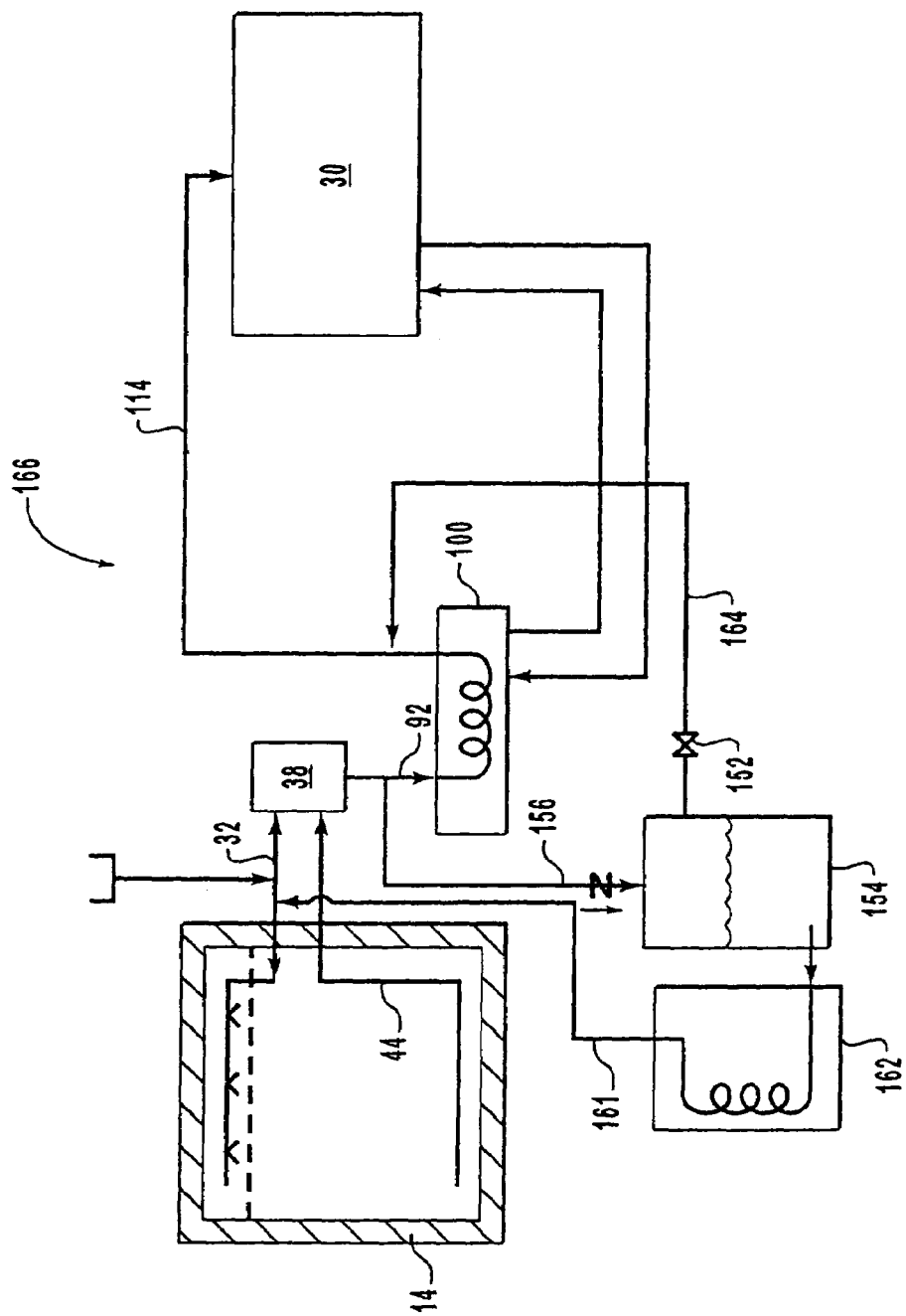

Depicted in FIG. 11 is a fluid delivery system 166 similar to fluid delivery system 150 depicted in FIG. 10. In contrast, however, conduit 164 now extends from reservoir 154 to delivery conduit 114. Solenoid valve 152 has also been moved from transition conduit 92 to conduit 164. When solenoid valve 152 is open, liquified gas passes from transition conduit 92 into reservoir 154 through conduit 156. When solenoid 152 is closed, liquified gas within reservoir 154 travels through vaporizer 162 and back into conduit 32 for pressurizing the system.

Figure 12:
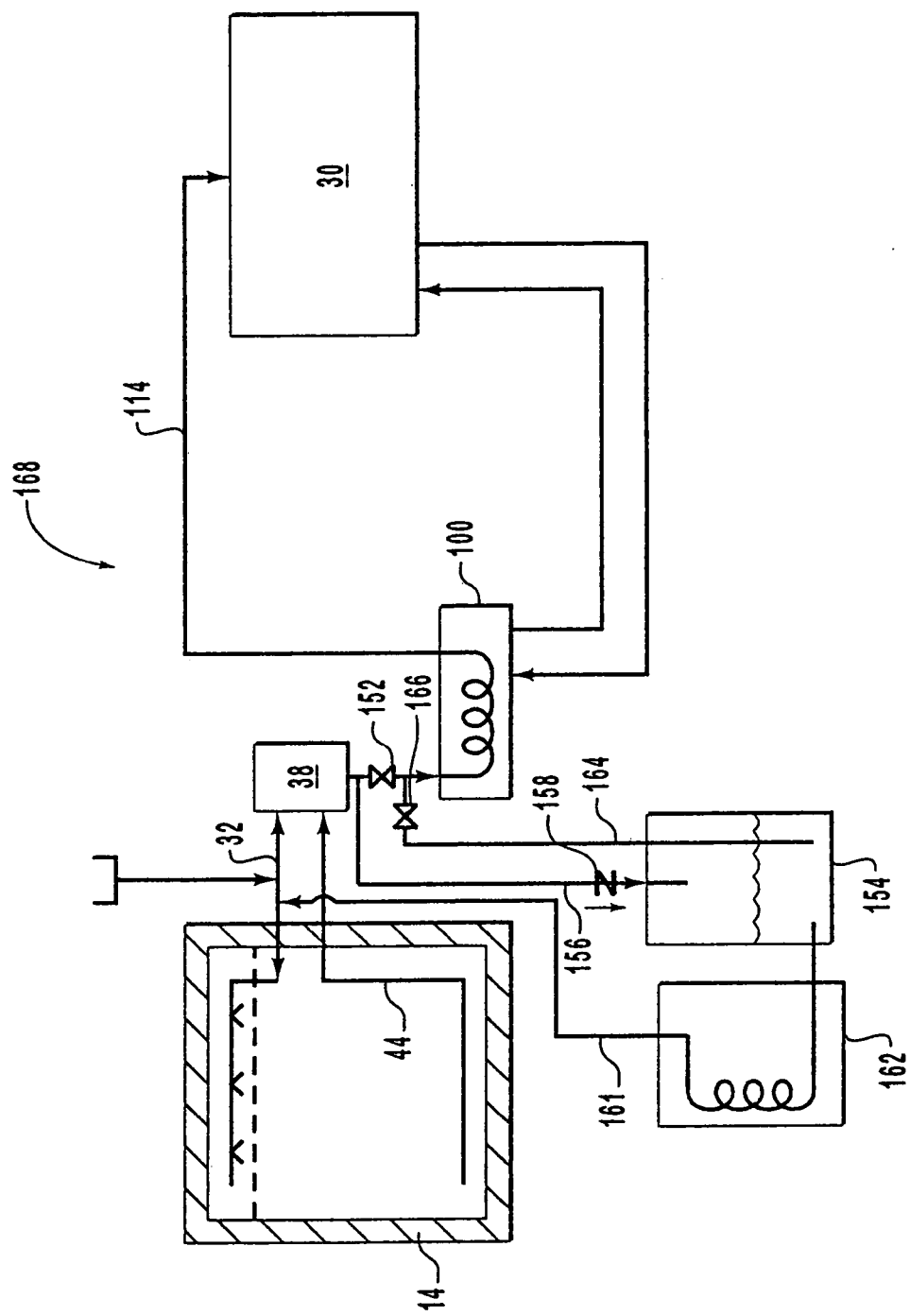

Depicted in FIG. 12 is a fluid delivery system 168 substantially the same as that depicted in FIG. 10 except that an additional solenoid 166 has been positioned on conduit 164. When solenoid 166 is closed, liquified gas in reservoir 154 is vaporized in vaporizer 162 and returned to vapor conduit 32 for pressurizing the system.

Figure 13:
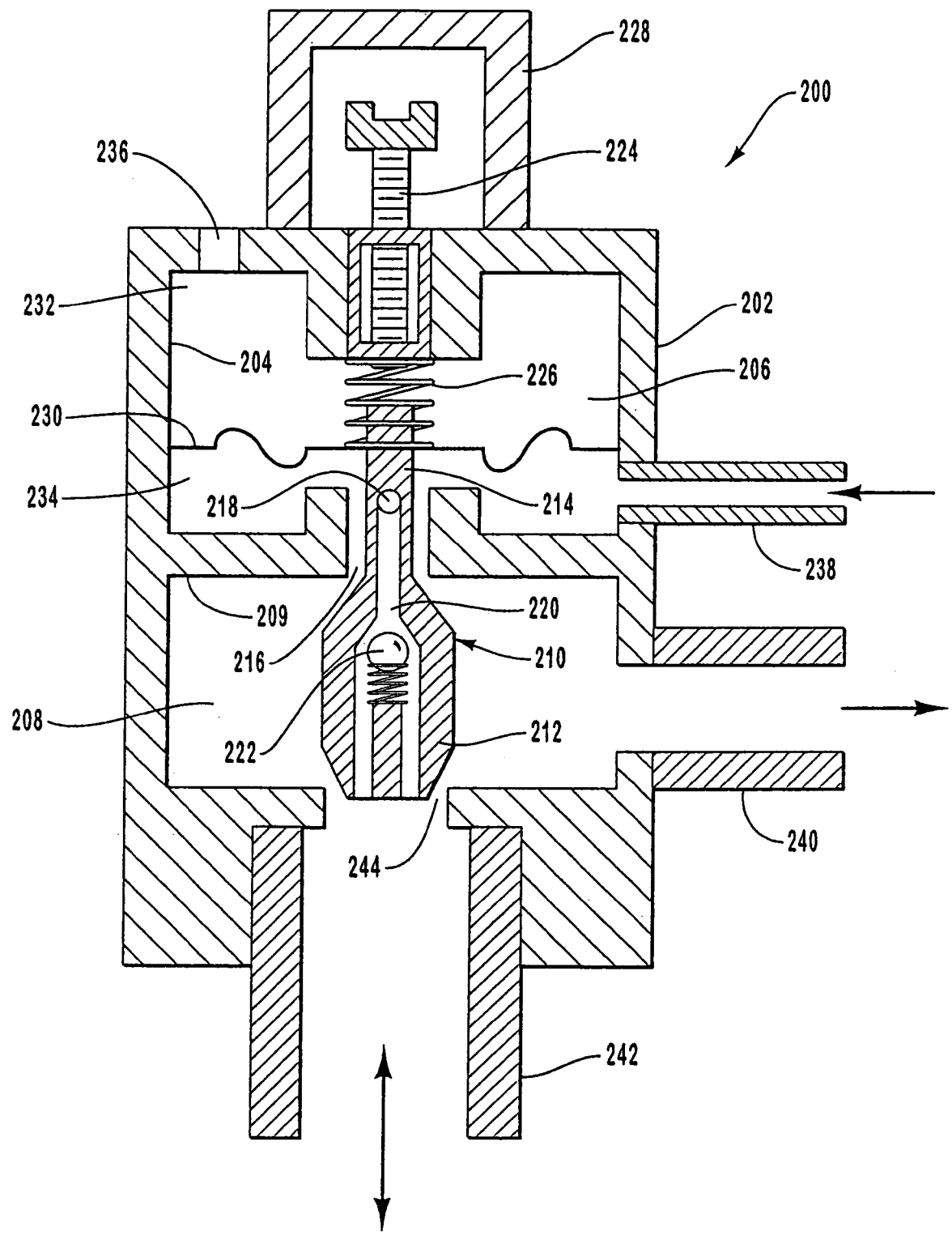
FIG. 13 is a schematic cross-sectional view of a valve device according to an alternative embodiment of the invention.

FIG. 13 is a schematic cross-sectional view of a valve device in the form of an ecoshunt valve 200 according to an alternative embodiment of the invention. The valve 200 is another example of a control means which performs the function of automatically withdrawing a select gas, chosen from either a liquified gas or a liquified gas vapor, from the tank based on the pressure within the tank. The valve 200 can be used in place of the economizer valve discussed previously such as in delivery system 18 of FIG. 2. The valve 200 combines the functions of the economizer valve with shunt control and thus is called an "ecoshunt" valve. The valve 200 performs the functions of proportioning fluid flow to an engine between an all gas phase fluid comprising liquified gas vapor and an all liquid phase fluid comprising liquified gas, while directing available excess liquid phase fluid back to the tank for maintaining an operating pressure therein. The valve 200 may be constructed to retrofit to current tank designs with some modification to the tank, or can be integrated with a tank design for improved reliability and robustness.

As depicted in FIG. 13, valve device 200 includes a housing 202 having an interior surface 204 bounding a pair of first and second interior chambers 206 and 208, which are separated by a dividing wall 209. Longitudinally disposed between chambers 206 and 208 is a proportioning spool 210. The spool 210 includes an enlarged head portion 212 disposed in chamber 208 which tapers to an elongated stem portion 214 that extends into chamber 206 through a passageway 216 in dividing wall 209.

A shunt system is provided in spool 210 and includes a shunt port 218 in stem portion 214 that communicates with a shunt channel 220 which passes through head portion 212. A shunt check valve 222 is provided in channel 220. The shunt check valve 222 is one example of a means for regulating the flow of liquified gas through channel 220. Other regulating means will be readily apparent to those skilled in the art, such as various other valve configurations. The shunt system is an example of a means for maintaining an operating pressure within the vapor holding portion of a tank.

A pressure set screw 224 passes through housing 202 into chamber 206 and is operatively connected to stem portion 214 of spool 210 by way of a pressure control spring 226. The pressure set screw 224 and associated pressure control spring 226 are an example of a means for positioning spool 210 within chambers 206 and 208. It will be understood by those skilled in the art that a variety of other configurations may be utilized to accomplish this function, such as an electrical control device which is discussed in further detail hereafter. A dust cover 228 can be placed over pressure set screw 224 if desired.

A diaphragm 230 extends across chamber 206 and is sealed against stem portion 214 and interior surface 204, thereby dividing chamber 206 into two isolated compartments 232 and 234. The diaphragm 230 is also connected to spring 226. The compartment 232 communicates with the atmosphere through a vent opening 236 in housing 202 and houses spring 226. The compartment 234 is in fluid communication with liquified gas from a tank through an inlet conduit 238. The chamber 208 is in communication with a vaporizer/engine through an outlet conduit 240. The chamber 208 is also in bidirectional communication with the vapor holding portion of the tank through a conduit 242, which communicates with an opening 244 in housing 202.

During operation of a liquified gas delivery system such as shown in FIG. 2, which employs valve 200 in place of economizer valve 38, a tank is filled with a fluid that has a low saturation pressure such as a liquified gas. If the tank is at lower pressure conditions and pressure set screw 224 is set at a much higher pressure, the difference between the tank and atmosphere deforms diaphragm 230 downward, thereby moving spool 210 such that passageway 216 is opened, with opening 244 being sealed by head portion 212. This allows liquified gas to flow from inlet conduit 238 and compartment 234 into chamber 208 and through outlet conduit 240 to the vaporizer/engine, with the passage from the vapor holding portion of the tank to the vaporizer/engine being closed.

A false head pressure is generated when a pressure drop is created across check valve 222 in spool 210. This pressure drop opens check valve 222, which allows a small quantity of liquified gas to pass through shunt channel 220 and into vapor conduit 242 toward the vapor holding portion of the tank. This small quantity of liquified gas is vaporized from the heat added as it passes back into the tank. The added heat increases vapor pressure and thus tank pressure. Since there is essentially no natural pressure drop across check valve 222, one is created from the dynamics of vaporization of fuel going to the engine. This process continues until the tank pressure, spring force, and atmospheric pressures reach a force balance such that head portion 212 of spool 210 is positioned to allow both liquified gas and liquified gas vapor to pass to the vaporizer/engine, which position is shown in FIG. 13.

Should the tank be at higher pressure conditions than the set point as a result of no usage, the force balance at the spring/diaphragm interface will render spool 210 in the full up position, thereby closing passageway 216 and preventing liquified gas from entering chamber 208. This allows liquified gas vapor from vapor conduit 242 to pass through opening 244 into chamber 208 and through outlet conduit 240 toward the vaporizer/engine. Thus, all of the fuel is directed to the engine from the vapor holding portion of the tank until a force balance is again achieved.

Figure 14:
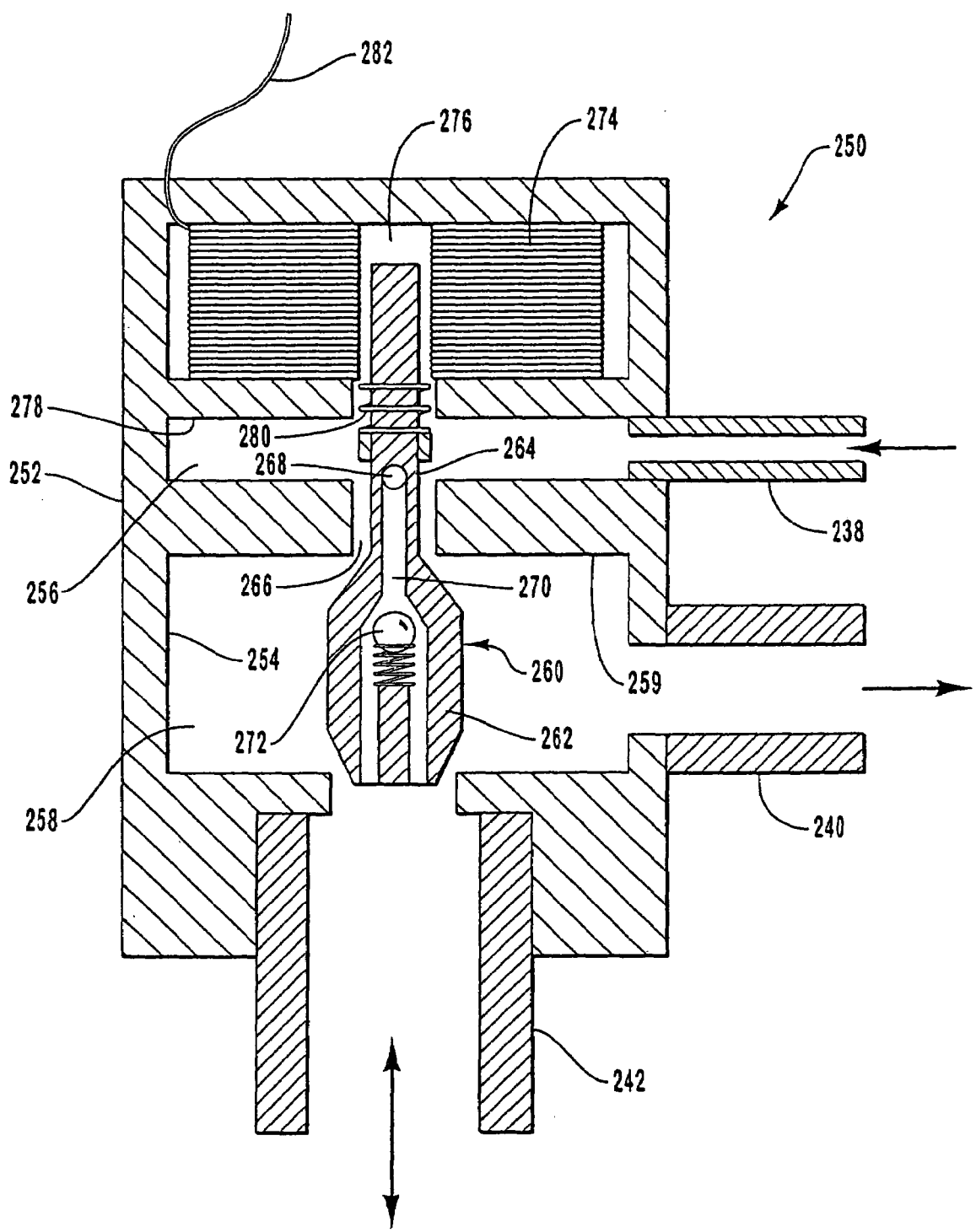
FIG. 14 is a schematic cross-sectional view of a valve device according to another alternative embodiment of the invention.

FIG. 14 is a cross-sectional view of a valve device in the form of an ecoshunt valve 250 according to another alternative embodiment of the invention which is electrically controlled. The valve 250 is another example of a control means which performs the function of automatically withdrawing a select gas from the tank based on the pressure within the tank.

The valve 250 includes similar components as discussed above for valve 200, including a housing 252 having an interior surface 254 bounding a pair of first and second interior chambers 256 and 258, which are separated by a dividing wall 259. A proportioning spool 260 is disposed between chambers 256 and 258. The spool 260 includes an enlarged head portion 262 disposed in chamber 258 which tapers to an elongated stem portion 264 that extends into chamber 256 through a passageway 266 in dividing wall 259. A shunt port 268 in stem portion 264 communicates with a shunt channel 270 which passes through head portion 262. A shunt check valve 272 is provided in channel 270 to regulate the flow of liquified gas through channel 270. The chamber 256 is in fluid communication with liquified gas from a tank through an inlet conduit 238. The chamber 258 is in communication with a vaporizer/engine through an outlet conduit 240. The chamber 258 is also in bidirectional communication with the vapor holding portion of the tank through a conduit 242.

As shown in FIG. 14, valve 250 utilizes an electrical actuation device as a means for positioning spool 260 rather than a pressure set screw as in valve 200. Accordingly, an electrical control coil 274 is provided in a third chamber 276 defined by housing 252 and a dividing wall 278 separating chamber 276 from chamber 256. The stem portion 264 of spool 260 extends into chamber 276 and a positioning spring 280 is configured around stem portion 264 adjacent to control coil 274. A power input 282 from a power source (not shown) is operatively connected to control coil 274. This approach makes valve 250 more readily adjustable, with valve 250 capable of being controlled by a computer or a simple pressure switch. The valve 250 and chambers therein are also hermetically sealed by housing 252, which means there are no dynamic parts that can fail such that fuel would be released into the atmosphere.

The valve 250 functions in a similar manner as described above for valve 200 in that valve 250 proportions fluid flow between an all gas phase fluid and an all liquid phase fluid, while directing available excess liquid phase fluid into the pressure building process. During operation, the pressure is set by electrical actuation of control coil 274 which adjusts the position of spool 260 through magnetic interaction with stem portion 264 and spring 280. If the tank is at low pressure and the pressure is set at a much higher pressure, the difference between the tank and the set pressure causes spool 210 to move such that passageway 266 is opened. This allows liquified gas to flow from inlet conduit 238 and chamber 256 into chamber 258 and through outlet conduit 240 to the vaporizer/engine.

A false head pressure is generated when a pressure drop is created across check valve 272 in spool 260. This pressure drop opens check valve 272, which allows a small quantity of liquified gas to pass through shunt channel 270 and into vapor conduit 242 toward the vapor holding portion of the tank. This small quantity of liquified gas is vaporized from the heat added as it passes back into the tank, thus increasing tank pressure. This process continues until the tank pressure, spring force, and set pressure reach a force balance as described previously. Should the tank be at a higher pressure than the set point, the force balance will render spool 260 in the full up position, thereby closing passageway 266 and preventing liquified gas from entering chamber 258. This allows liquified gas vapor from vapor conduit 242 to pass into chamber 258 and through outlet conduit 240 toward the vaporizer/engine until a force balance is again achieved.

Figure 15:
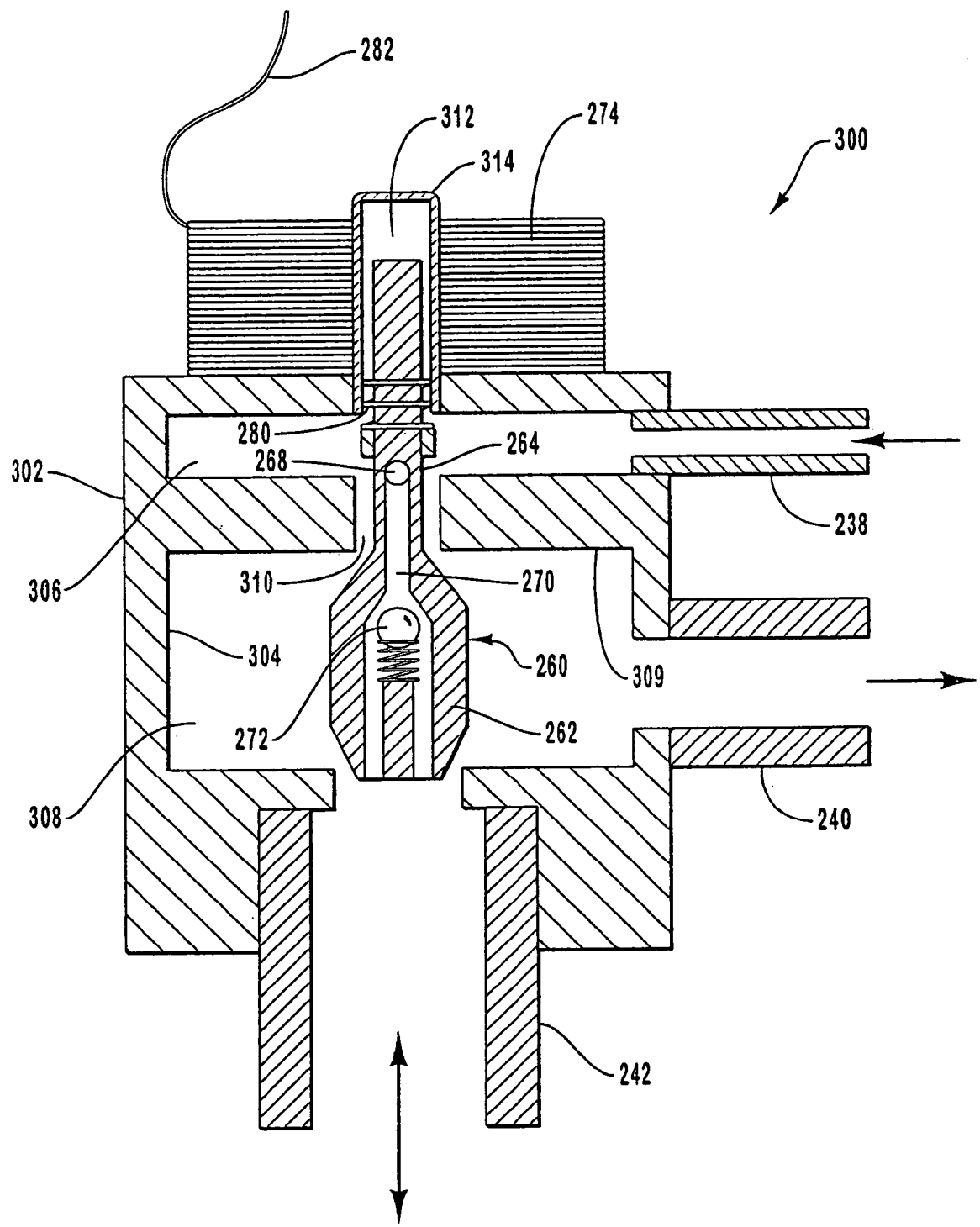
FIG. 15 is a schematic cross-sectional view of a valve device according to a further alternative embodiment of the invention.

FIG. 15 is a cross-sectional view of a valve device in the form of an ecoshunt valve 300 according to a further alternative embodiment of the invention which is electrically controlled. Like the other ecoshunt valves previously discussed, valve 300 is also configured to perform the function of automatically withdrawing a select gas from the tank based on the pressure within the tank.

The valve 300 includes similar components as discussed above for valve 250, including a housing 302 having an interior surface 304 bounding a pair of first and second interior chambers 306 and 308, which are separated by a dividing wall 309. A proportioning spool 260 is disposed between chambers 306 and 308. The spool 260 includes an enlarged head portion 262 disposed in chamber 308 and a stem portion 264 that extends into chamber 306 through a passageway 310 in dividing wall 309. A shunt port 268 in stem portion 264 communicates with a shunt channel 270, and a shunt check valve 272 is provided in channel 270. The chamber 306 is in fluid communication with liquified gas from a tank through an inlet conduit 238. The chamber 308 is in communication with a vaporizer/engine through an outlet conduit 240. The chamber 308 is also in bidirectional communication with the vapor holding portion of the tank through a conduit 242.

As shown in FIG. 15, valve 300 also utilizes an electrical actuation device as a means for positioning spool 260. The electrical actuation device is in the form of an electrical control coil 274 which is configured on the outside of housing 302 around a third interior chamber 312 in which stem 264 of spool 260 moves. The chamber 312 is in fluid communication with chamber 306, and is bounded by a seal end cap 314 constructed of a non-magnetic material. Suitable non-magnetic materials for end cap 314 include aluminum, titanium, nickel/titanium alloys, and some stainless steels. The non-magnetic material of end cap 314 allows the magnetic field generated by coil 274 to control the position of spool 260 through the magnetic coupling of coil 274 and stem 264. A positioning spring 280 is configured around stem portion 264 adjacent to chamber 312, and a power input 282 is operatively connected to coil 274.

The valve 300 functions in a similar manner as described above for valve 250 in that valve 300 proportions fluid flow between an all gas phase fluid and an all liquid phase fluid, while directing available excess liquid phase fluid into the pressure building process. During operation, the pressure is set by electrical actuation of coil 274 which adjusts the position of spool 260. The configuration of valve 300 with coil 274 on the outside of housing 302 allows for convenient maintenance and repair of coil 274, which can be done without compromising the integrity of valve 300 which is sealed or the need to drain valve 300 prior to maintenance or repair.

Figure 16A:
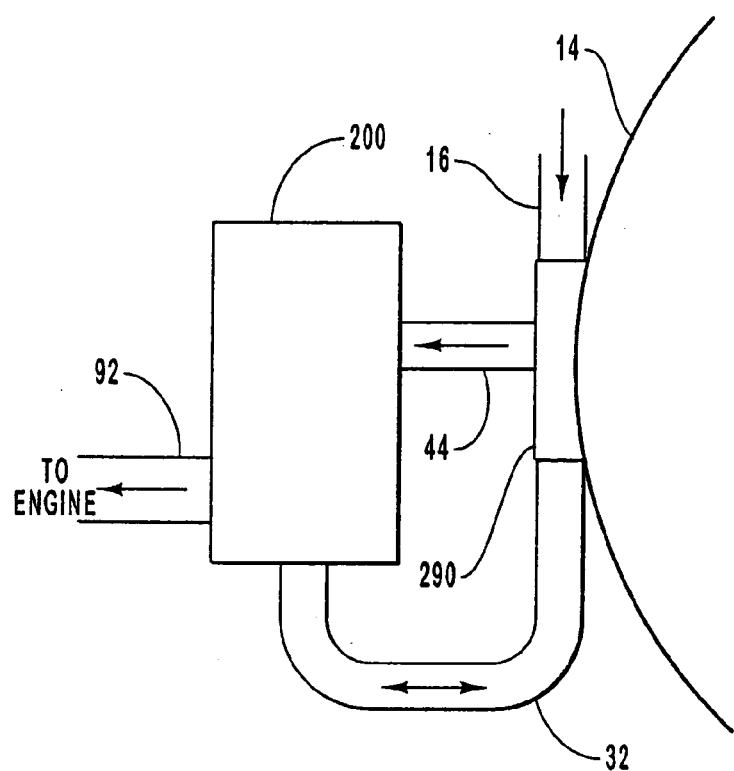
FIGS. 16A and 16B are schematic representations of alternative embodiments for connecting a valve device to a holding tank according to the invention.
Figure 16B:
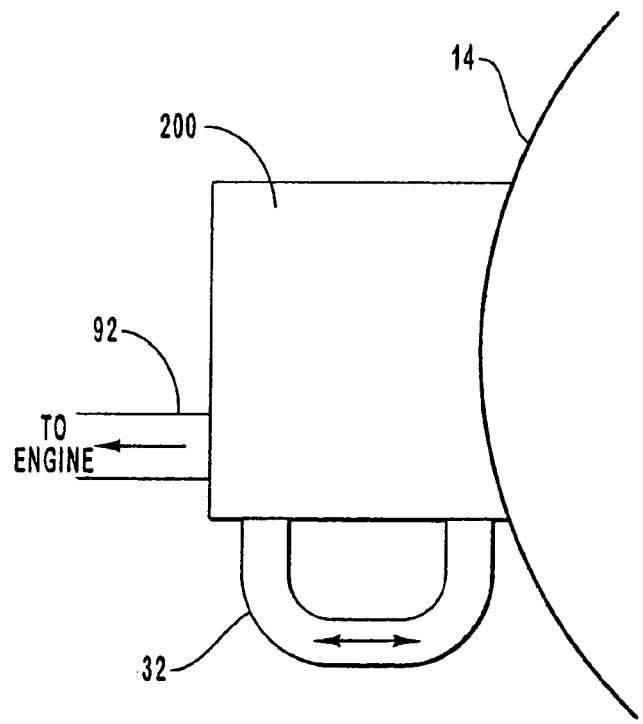

FIGS. 16A and 16B are schematic representations of alternative embodiments for connecting a valve device, such as valves 200 and 250 discussed previously, to a tank according to the present invention. In FIG. 16A, valve 200 is shown in a retrofit type connection to a tank 14, which is filled by passing liquified gas through an inlet 16. A vapor conduit 32 having bidirectional flow capability provides fluid communication between valve 200 and the vapor holding portion of tank 14. Liquified gas flows through a supply conduit 44 to valve 200. An external connection section 290 attached to tank 14 provides various conduits and ports for each of inlet 16, vapor conduit 32, and supply conduit 44 so that these components function properly. A transition conduit 92 provides fluid communication between valve 200 and the engine. Each of these respective components shown in FIG. 16A function in the manner as described previously.

In FIG. 16B, valve 200 is shown as an integrated part of a tank 14, which provides improved reliability and robustness to valve 200. The vapor conduit 32 can be formed externally as shown in FIG. 16B, or alternatively, can be part of the internal structure of tank 14. A transition conduit 92 provides fluid communication between valve 200 and the engine as described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for delivering liquified gas to an engine, the system comprising:
    a holding tank configured to receive liquified gas at saturated conditions, the tank having a liquid holding portion and a vapor holding portion;
    a valve device in fluid communication with the liquid holding portion and the vapor holding portion of the tank, the valve device adapted to automatically withdraw a liquified gas or a liquified gas vapor from the tank based on the pressure within the tank;
    a vaporizer in fluid communication with the valve device;
    a delivery conduit extending from the vaporizer to an engine; and
    means for maintaining an operating pressure within the vapor holding portion of the tank comprising a return conduit extending from the delivery conduit to the tank.

2. The system of claim 1, wherein the valve device comprises an economizer valve.

3. The system of claim 1, wherein the valve device comprises an ecoshunt valve.

4. The system of claim 1, wherein the holding tank and the vaporizer are cooperatively located and configured to develop a pressure head between the holding tank and the vaporizer.

5. A system for delivering liquified gas to an engine, the system comprising:
    a holding tank configured to receive liquified gas at saturated conditions, the tank having a liquid holding portion and a vapor holding portion;

a valve device in fluid communication with the liquid holding portion and the vapor holding portion of the tank, the valve device adapted to automatically withdraw a liquified gas or a liquified gas vapor from the tank based on the pressure within the tank;

a vaporizer in fluid communication with the valve device;

a delivery conduit extending from the vaporizer to an engine; and means for maintaining an operating pressure within the vapor holding portion of the tank comprising a secondary vaporizer configured to receive liquified gas from the tank and return liquified gas vapor to the tank.

6. The system of claim 1, wherein the means for maintaining an operating pressure further comprises a shunt system within the valve device.

7. The system of claim 4, wherein the holding tank and the vaporizer are cooperatively located and configured to develop a pressure head sufficient to flow an amount of vapor from the vaporizer back to the holding tank through the return conduit.

8. The system of claim 1, wherein the vaporizer is located at a first elevation and wherein the holding tank is located and configured relative to the vaporizer such that a boundary between vapor holding portion and the liquid holding portion of the holding tank is at a second elevation higher than the first elevation.

9. The system of claim 1, wherein the valve device further comprises:

a housing defining a first chamber and a second chamber, the first chamber configured to receive liquefied gas from the liquid holding portion of the holding tank and the second chamber configured to receive vapor from the vapor holding portion of the holding tank;

a proportioning spool disposed between the first and second chambers, the spool including a head portion disposed in the second chamber and a stem portion that extends into the first chamber;

a shunt port in the stem portion, the port communicating with a shunt channel passing through the head portion;

a shunt check valve disposed in the shunt channel; and an actuator coupled with the proportion spool and configured to position the proportioning spool relative to the first and second chambers.

10. The system of claim 9, wherein the actuator includes a set screw coupled with the stem portion of the proportioning spool.

11. The system of claim 9, wherein the actuator includes an electrical coil disposed about at least a portion of the stem portion of the proportioning spool.

12. The system of claim 1, wherein the vaporizer is located and configured to be in a heat exchange relationship with the engine.

13. The system of claim 5, wherein the holding tank and the vaporizer are cooperatively located and configured to develop a pressure head between the holding tank and the vaporizer.

14. The system of claim 5, wherein the vaporizer is located at a first elevation and wherein the holding tank is located and configured relative to the vaporizer such that a boundary between vapor holding portion and the liquid holding portion of the holding tank is at a second elevation higher than the first elevation.

15. The system of claim 5, wherein the valve device further comprises:

housing defining a first chamber and a second chamber, the first chamber configured to receive liquefied gas from the liquid holding portion of the holding tank and the second chamber configured to receive vapor from the vapor holding portion of the holding tank;

a proportioning spool disposed between the first and second chambers, the spool including a head portion disposed in the second chamber and a stem portion that extends into the first chamber;

a shunt port in the stem portion, the port communicating with a shunt channel passing through the head portion;

a shunt check valve disposed in the shunt channel; and an actuator coupled with the proportion spool and configured to position the proportioning spool relative to the first and second chambers.

16. The system of claim 15, wherein the actuator includes a set screw coupled with the stem portion of the proportioning spool.

17. The system of claim 15, wherein the actuator includes an electrical coil disposed about at least a portion of the stem portion of the proportioning spool.

18. The system of claim 5, wherein the vaporizer is located and configured to be in a heat exchange relationship with the engine.

19. The system of claim 5, wherein the valve device comprises an economizer valve.

20. The system of claim 5, wherein the valve device comprises an ecoshunt valve.

* * * * *